(12) United States Patent
Yang

(10) Patent No.: US 7,502,158 B2
(45) Date of Patent: Mar. 10, 2009

(54) METHOD AND STRUCTURE FOR HIGH FILL FACTOR SPATIAL LIGHT MODULATOR WITH INTEGRATED SPACER LAYER

(75) Inventor: Xiao Yang, Cupertino, CA (US)

(73) Assignee: Miradia Inc., Sunnyvale, CA (US)

( * ) Notice: Subject to any disclaimer, the term of this patent is extended or adjusted under 35 U.S.C. 154(b) by 147 days.

(21) Appl. No.: 11/250,297

(22) Filed: Oct. 13, 2005

(65) Prior Publication Data

US 2007/0091413 A1 Apr. 26, 2007

(51) Int. Cl.
G02B 26/00 (2006.01)
G02B 26/08 (2006.01)

(52) U.S. Cl. ................................ 359/290; 359/224
(58) Field of Classification Search .............. 359/214, 359/223–225, 290–292, 295, 298
See application file for complete search history.

(56) References Cited

U.S. PATENT DOCUMENTS

| | | | |
|---|---|---|---|
| 4,229,732 A | 10/1980 | Hartstein et al. |
| 4,317,611 A | 3/1982 | Petersen |
| 4,566,935 A | 1/1986 | Hornbeck |
| 4,615,595 A | 10/1986 | Hornbeck |
| 5,061,049 A | 10/1991 | Hornbeck |
| 5,172,262 A | 12/1992 | Hornbeck |
| 5,311,360 A | 5/1994 | Bloom et al. |
| 5,382,961 A | 1/1995 | Gale, Jr. |
| 5,448,314 A | 9/1995 | Heimbuch et al. |
| 5,452,024 A | 9/1995 | Sampsell |
| 5,489,952 A | 2/1996 | Gove et al. |
| 5,504,614 A | 4/1996 | Webb et al. |
| 5,535,047 A | 7/1996 | Hornbeck |
| 5,583,688 A | 12/1996 | Hornbeck |
| 5,589,852 A | 12/1996 | Thompson et al. |
| 5,600,383 A | 2/1997 | Hornbeck |
| 5,661,591 A | 8/1997 | Lin et al. |
| 5,663,749 A | 9/1997 | Farris et al. |
| 5,742,419 A | 4/1998 | Dickensheets et al. |
| 5,757,536 A | 5/1998 | Ricco et al. |
| 5,835,256 A | 11/1998 | Huibers |
| 5,885,468 A | 3/1999 | Kozlowski |
| 5,939,171 A | 8/1999 | Biebl |

(Continued)

FOREIGN PATENT DOCUMENTS

EP 1237032 A2 9/2002

(Continued)

OTHER PUBLICATIONS

Henley et al., "A New SOI Manufacturing Technology Using Atomic layer Cleaving." Silicon Genesis Corporation Campbell CA. pp. 1-5.

(Continued)

*Primary Examiner*—William C Choi
(74) *Attorney, Agent, or Firm*—Townsend and Townsend and Crew LLP

(57) ABSTRACT

A high fill factor spatial light modulator. The spatial light modulator includes a device layer coupled to a support base. The device layer includes a mirror plate and a coplanar flexible member. The spatial light modulator also includes a patterned spacer layer coupled to the mirror plate. In some embodiments, the spacer layer is fabricated from an aluminum layer. The method further includes a reflective layer coupled to the spacer layer.

13 Claims, 18 Drawing Sheets

U.S. PATENT DOCUMENTS

| | | |
|---|---|---|
| 5,999,306 A | 12/1999 | Atobe et al. |
| 6,038,056 A | 3/2000 | Florence et al. |
| 6,046,840 A | 4/2000 | Huibers |
| 6,049,317 A | 4/2000 | Thompson et al. |
| 6,127,756 A | 10/2000 | Iwaki et al. |
| 6,172,797 B1 | 1/2001 | Huibers |
| 6,201,521 B1 | 3/2001 | Doherty |
| 6,252,277 B1 | 6/2001 | Chan et al. |
| 6,323,982 B1 | 11/2001 | Hornbeck |
| 6,337,760 B1 | 1/2002 | Huibers et al. |
| 6,356,378 B1 | 3/2002 | Huibers |
| 6,386,661 B1 | 5/2002 | Richards |
| 6,396,619 B1 | 5/2002 | Huibers et al. |
| 6,429,033 B1 | 8/2002 | Gee et al. |
| 6,529,310 B1 | 3/2003 | Huibers et al. |
| 6,538,800 B2 | 3/2003 | Huibers |
| 6,542,653 B2 | 4/2003 | Wu et al. |
| 6,543,286 B2 | 4/2003 | Garverick et al. |
| 6,809,852 B2 | 10/2004 | Tao et al. |
| 6,856,068 B2 | 2/2005 | Miller et al. |
| 6,980,349 B1 | 12/2005 | Huibers et al. |
| 7,106,491 B2 * | 9/2006 | Meyer et al. ............... 359/291 |
| 7,388,708 B2 * | 6/2008 | Pan .......................... 359/291 |
| 2002/0041455 A1 | 4/2002 | Sawada et al. |
| 2002/0071166 A1 | 6/2002 | Jin et al. |
| 2002/0071169 A1 | 6/2002 | Bowers et al. |
| 2002/0132389 A1 | 9/2002 | Patel et al. |
| 2003/0117686 A1 | 6/2003 | DiCarto |
| 2003/0207487 A1 | 11/2003 | Kubena et al. |
| 2004/0000696 A1 | 1/2004 | Ma et al. |
| 2004/0004753 A1 | 1/2004 | Pan |
| 2004/0008402 A1 | 1/2004 | Patel et al. |
| 2004/0125347 A1 | 7/2004 | Patel et al. |
| 2004/0136044 A1 | 7/2004 | Miller et al. |
| 2004/0136045 A1 * | 7/2004 | Tran .......................... 359/224 |
| 2004/0184133 A1 | 9/2004 | Su et al. |
| 2004/0190817 A1 | 9/2004 | Aubuchon |
| 2005/0041277 A1 | 2/2005 | Huibers |

OTHER PUBLICATIONS

Petersen, K.E., "Micromechanical Light Modulator Array Fabricated On Silicon", Applied Physics Letters. Oct. 15, 1977, vol. 31 No. 8, pp. 521-523.

Petersen, K.E., "Micromechanical Membrane Switches On Silicon", IBM J. Res. Develop., Jul. 1979, vol. 23, No. 4, pp. 376-385.

* cited by examiner

METHOD AND STRUCTURE FOR HIGH FILL FACTOR SPATIAL LIGHT MODULATOR WITH INTEGRATED SPACER LAYER

BACKGROUND OF THE INVENTION

This present invention relates generally to manufacturing objects. More particularly, the invention relates to a method and structure for fabricating a spatial light modulator with a high fill factor. Merely by way of example, the invention has been applied to the formation of a spatial light modulator having a torsion spring hinge and mirror plate positioned in the same plane with a uniform reflective layer covering the torsion spring hinge. The method and device can be applied to spatial light modulators as well as other devices, for example, micro-electromechanical sensors, detectors, and displays.

Spatial light modulators (SLMs) have numerous applications in the areas of optical information processing, projection displays, video and graphics monitors, televisions, and electrophotographic printing. Reflective SLMs are devices that modulate incident light in a spatial pattern to reflect an image corresponding to an electrical or optical input. The incident light may be modulated in phase, intensity, polarization, or deflection direction. A reflective SLM is typically comprised of an area or two-dimensional array of addressable picture elements (pixels) capable of reflecting incident light. A key parameter of SLMs, especially in display applications, is the portion of the optically active area to the pixel area (also measured as the fraction of the SLM's surface area that is reflective to the total surface area of the SLM, also called the "fill ratio" or "fill factor"). A high fill factor is desirable for some applications.

Some conventional SLMs utilize designs that include substantial non-reflective areas on their surfaces, reducing the SLMs reflective efficiency. Another problem that reduces reflective efficiency with some SLM designs, particularly in some top hanging mirror designs, is large exposed hinge surface areas. These exposed hinge surface areas result in scattering and diffraction due to the exposed hinge structure, which negatively impacts contrast ratio in display applications, among other parameters.

Other conventional SLMs require multiple layers including a separate layer for the mirrors, hinges, electrodes and/or control circuitry. Manufacturing such a multi-layer SLM requires the use of multi-layer thin film stacking and etching techniques and processes. Use of these techniques and processes may be expensive and produce lower than desired yields. For example, the use of these techniques sometimes involves extensive deposition and removal of sacrificial materials underneath the surface of the mirror plates. Multi-layer thin film deposition and stacking underneath the surface of the mirror plate typically results in rougher mirror surfaces, thereby reducing the reflective efficiency of the mirrors. Moreover, having the mirror and the hinge in a different layer or substrate results in translational displacement upon deflection of the mirror. With translational displacements, the mirrors in an array must be spaced to avoid mechanical interference among adjacent mirrors. Because the mirrors in the array cannot be located too closely to the other mirrors in the array, the SLM suffers from a lower than optimal optically active area or lower fill factor.

Thus, there is a need in the art for a spatial light modulator with improved reflective efficiency, SLM device long-term reliability, and simplified manufacturing processes.

SUMMARY OF THE INVENTION

According to the present invention, techniques for manufacturing objects are provided. More particularly, the invention relates to a method and structure for fabricating a spatial light modulator with a high fill factor. Merely by way of example, the invention has been applied to the formation of a spatial light modulator having a torsion spring hinge and mirror plate positioned in the same plane with a uniform reflective layer covering the torsion spring hinge. The method and device can be applied to spatial light modulators as well as other devices, for example, micro-electromechanical sensors, detectors, and displays.

In an embodiment of the present invention, a high fill factor spatial light modulator is provided. The spatial light modulator includes a device layer coupled to a support base. In some embodiments, the device layer includes a mirror plate and a coplanar flexible member, such as a torsion spring hinge. The spatial light modulator also includes a patterned spacer layer coupled to the mirror plate. In a specific embodiment, the spacer layer is fabricated from an aluminum layer. The spatial light modulator further includes and a reflective layer coupled to the spacer layer.

In another embodiment of the present invention, a method of fabricating a high fill factor spatial light modulator is provided. The method includes providing a mirror structure including a device layer and forming a spacer layer coupled to the device layer. The spacer layer is characterized by a first thickness and in a specific embodiment, the spacer layer is a layer of aluminum. The method also includes releasing a torsion spring hinge from the device layer. In some embodiments according to the present invention, the torsion spring hinge and the device layer are characterized by an equal thickness. The method further includes forming a release layer coupled to the spacer layer and the mirror structure and forming a reflective layer coupled to the release layer. The release layer in a particular embodiment is a layer of photoresist. Moreover, the method includes removing the release layer to form a gap between the torsion spring hinge and the reflective layer. In an embodiment, the gap is equal in at least one dimension to the first thickness. The method additionally includes releasing a plurality of micro-mirrors from the device layer.

In an alternative embodiment of the present invention, a method of fabricating a spatial light modulator is provided. The method includes providing a silicon device layer coupled to a support base. The method also includes forming an adhesion layer on the silicon device layer, forming a spacer layer on the adhesion layer, and patterning the spacer layer. The method further includes forming a torsion spring hinge from the silicon device layer and forming a release layer. In an embodiment, the release layer is coupled to the adhesion layer, the spacer layer, and the torsion spring hinge. Moreover, in a specific embodiment, the release layer is a layer of photoresist. Additionally, the method includes planarizing the release layer and forming a reflective layer coupled to the release layer and the spacer layer. In some embodiments, the reflective layer is a layer of aluminum. Moreover, the method includes forming a mirror plate from the silicon device layer and removing the release layer.

Numerous benefits are achieved using the present invention over conventional techniques. For example, in an embodiment according to the present invention, a torsion spring hinge is substantially concealed under a reflective surface. By hiding the hinge, the amount of scattering and diffraction due to light hitting and reflecting off of an exposed hinge structure is eliminated, thereby maximizing the contrast ratio of a display device. Moreover, in a specific embodiment, the hinge and mirror plates are fabricated from the same layer of material. As a result, there is no built-in stress between the hinge and mirror, no thermal mismatch, and other integration issues. In additional, since the hinge and mirror are in the same plane, i.e. co-planar, there is no translational movement or displacement as the mirror rotates about the longitudinal axis of the hinge. With no translational displacement, the gap between the mirrors and/or any support structures is limited only by the fabrication technology and process. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

DETAILED DESCRIPTION OF SPECIFIC EMBODIMENTS

According to the present invention, techniques for manufacturing objects are provided. More particularly, the invention relates to a method and structure for fabricating a spatial light modulator with a high fill factor. Merely by way of example, the invention has been applied to the formation of a spatial light modulator having a torsion spring hinge and mirror plate positioned in the same plane with a uniform reflective layer covering the torsion spring hinge. The method and device can be applied to spatial light modulators as well as other devices, for example, micro-electromechanical sensors, detectors, and displays.

Figure 1:
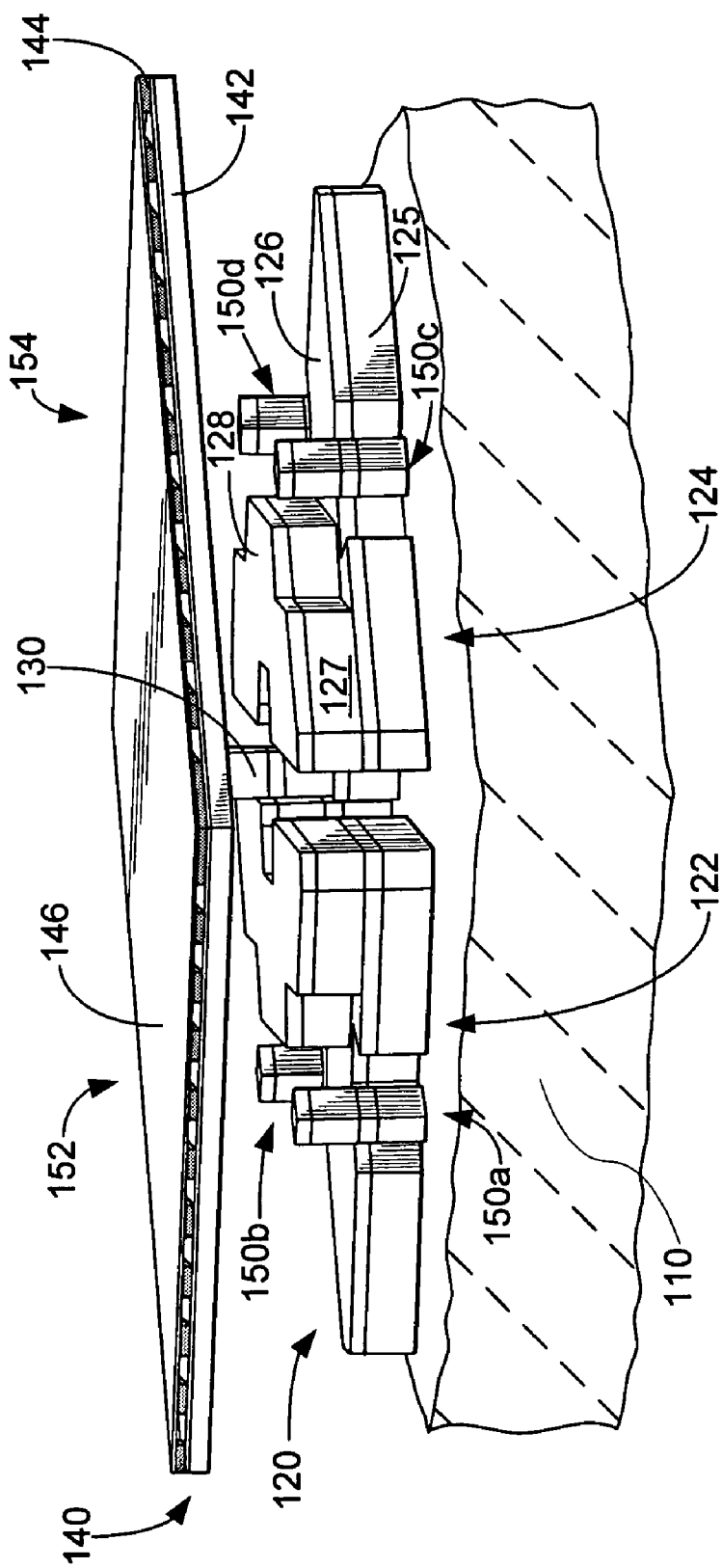
FIG. 1 is a simplified perspective view of an SLM according to an embodiment of the present invention.

FIG. 1 is a simplified perspective view of an SLM according to an embodiment of the present invention. As illustrated in FIG. 1, a first substrate 110 is provided and an electrode structure 120 is coupled to the first substrate. In an embodiment, the electrode structure includes a set of multi-level electrodes 122/124 coupled to the first surface. Additionally, a central support structure 130, sometimes referred to as an integrated standoff structure, is coupled to the first substrate. A mirror structure 140, including a device layer 142, a patterned spacer layer 144, and a reflective layer 146 is coupled to the central support structure. In some embodiment, the device layer is fabricated from a silicon substrate, for example, a single crystal silicon wafer. Additional details related to the structure and the fabrication of the SLM are provided throughout the present specification.

As illustrated in FIG. 1, the SLM architecture utilizes an integrated standoff structure 130 coupled to and supporting the mirror structure 140. An SLM as illustrated in FIG. 1 may be fabricated according to techniques described more fully in U.S. patent application Ser. No. 11/143,363; filed Jul. 8, 2005, entitled "Co-Planar Surface and Torsion Device Mirror Structure and Method of Manufacture for Optical Displays" and U.S. patent application Ser. No. 11/143,371; filed Jul. 28, 2005, entitled "Method and Device for Fabricating a Release Structure to Facilitate Bonding of Mirror Devices Onto a Substrate," and commonly owned and incorporated by reference for all purposes. Of course, embodiments of the present invention are not limited to an integrated standoff structure. Merely by way of example, standoff structures, sometimes referred to as spacer support frames, as described in U.S. patent application Ser. No. 10/756,936, filed Jan. 13, 2004, commonly owned and incorporated by reference for all purposes, are also included within the scope of the present invention.

The first substrate 110 can be made of any suitable material. The suitable material generally has mechanical stability and an ability to be processed using semiconductor processing techniques. As merely an example, the material can be a semiconductor. Preferably, the first surface is made from a silicon wafer, processed according to semiconductor processing techniques. Other materials may also be used in alternative embodiments according to the present invention.

In an embodiment of the present invention, the multi-level electrodes 122 and 124 are made of materials that conduct electricity. Merely by way of example, the multi-level electrodes in the embodiment according to the present invention illustrated in FIG. 1 are made by preferentially depositing and/or patterning a group of stacked or layered metals on the first substrate. Preferably, the electrodes are made of a multilayer stack of deposited aluminum 125, titanium nitride 126, aluminum 127, and titanium nitride 128 layers. In alternative embodiments according to the present invention, the electrode is made of greater of lesser numbers of layers, which may include other suitable conductors. Merely by way of example, in the embodiment illustrated in FIG. 1, the electrode is a step electrode with varying electrode height as a function of lateral position. In some embodiments, the step electrode is fabricated by the formation of a tungsten layer sandwiched between the lower titanium nitride layer 126 and the upper aluminum layer 127. The tungsten layer acts as an etch stop in a process that removes the upper layers of aluminum 127 and titanium nitride 128 from portions of the electrode structure, creating the step electrode illustrated in FIG. 1. Of course, other materials, such as oxides and/or other suitable etch stops may be utilized in other process flows.

When a voltage bias is applied between the mirror structure 140 and the electrode structure 120, the mirror plate is deflected due to electrostatic attraction. The electric field resulting from an electric potential applied to the electrode decreases as a function of distance from the electrode to the moveable member. Accordingly, secondary electrodes 127/128 effectively extend the height of the electrode structure 120 above that provided by the first level electrode 125/126, thereby decreasing the distance between the electrodes and the moveable structure. As a result of this decrease in distance, the magnitude of the electric field experienced by the mirror structure is increased. In comparison with single level electrodes, in some embodiments, the voltages applied to the electrodes are reduced while still obtaining the same electric field strength at the mirror structure.

Landing structures 150 are coupled to the first substrate as illustrated in FIG. 1. In a specific embodiment, the landing structures are fabricated from the same materials and during the same fabrication processes as the multi-level electrodes. In alternative embodiment, other materials are utilized for fabricating the landing posts. A number of landing structures are provided for both a first portion 152 and a second portion 154 of the mirror structure in the embodiment illustrated in FIG. 1. The placement, dimensions, and orientation of the landing structures are selected to optimize system performance and achieve design goals.

For example, the position of the landing posts is selected to minimize stiction torques present due to the contact between the mirror structure and the landing posts when the mirrors are in an activated position. Additional details regarding reductions in stiction torques are found in U.S. application Ser. No. 11/031,976, filed Jan. 7, 2005, commonly owned and incorporated by reference for all purposes.

In an embodiment according to the present invention, two landing structures 150a and 150b are adapted to make contact with the mirror structure when the mirror structure tilts in a counter-clockwise manner. The landing structures make contact with interior portions of the mirror structure, thereby maintaining an outer portion of the mirror structure free from physical contact with the first substrate or the electrodes. In some embodiments, this design reduces a magnitude of one or more parasitic forces.

Figure 2:
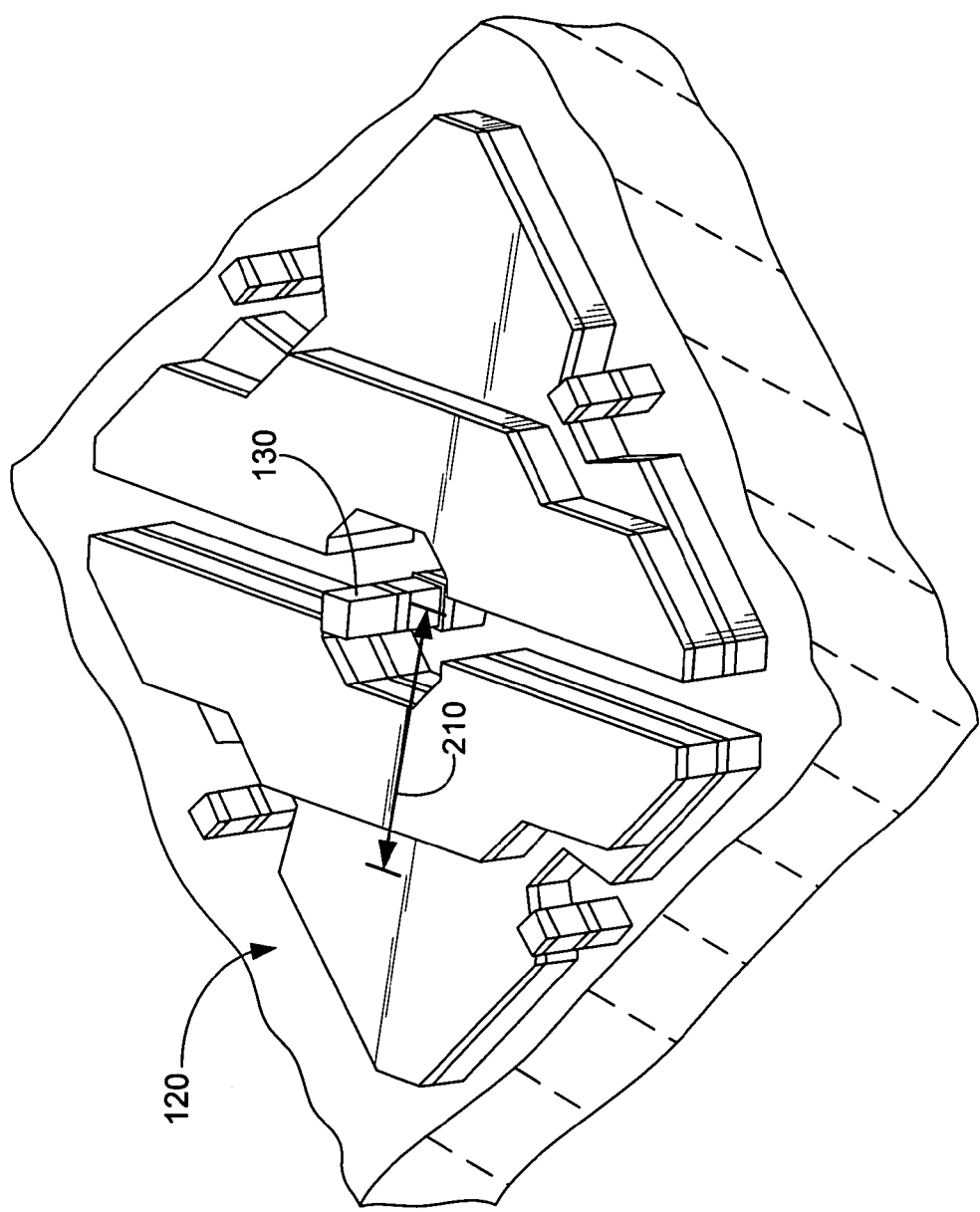
FIG. 2 is a simplified perspective view of an electrode layer for an SLM according to an embodiment of the present invention.

FIG. 2 is a simplified perspective view of an electrode layer for an SLM according to an embodiment of the present invention. In embodiments according to the present invention, the height, length, and width of the landing structures are predetermined values. For example, referring to FIG. 2, in a specific embodiment, the distance 210 from the integrated standoff structure to the landing structures or posts is a predetermined distance. In the embodiment illustrated in FIG. 2, the distance from the integrated standoff structure to the landing structures is about 4.0 μm. Alternatively, the distance ranges from about 3.0 μm to about 5.0 μm in other embodiments. Of course, the distance from the integrated standoff structure to the landing structures will depend on the particular applications.

In some embodiments according to the present invention, the distance from the integrated standoff structure to the landing structures is decreased to reduce the parasitic torque present at the integrated standoff structure. As described more fully below, the mirror structure is coupled to the integrated standoff structure by a flexible member, for example, a torsion spring hinge. As the mirror structure rotates under the influence of the electric field generated by the electrode voltage, a restoring torque is built up in the flexible member. This restoring torque is opposed by a parasitic torque that is a function of the distance from the landing structures to the flexible member and the component of the parasitic force ($F_S$) perpendicular to the mirror structure, present at the top of the landing structures, which acts on the mirror structure.

In embodiments according to the present invention, the height and position of the landing structures are selected so that the upper surface of the mirror structure is tilted at a predetermined angle with respect to the horizontal when the mirror structure is in an activated state. In embodiments according to the present invention in which the upper surface of the mirror structure comprises reflective portions, an incident ray of light will be reflected at predetermined angles depending on the tilt angle of the mirror structure. In the embodiment illustrated in FIGS. 1 and 2, the height and position of the landing structures are selected so that the mirror structure is tilted at an angle of 12° with respect to the horizontal in the activated state. Alternative embodiments have either increased or decreased tilt angles with respect to the horizontal.

Preferably, the dimensions of the mirror structure are selected so that when the mirror structure makes contact with the landing structures, the outer edges of the mirror structure are at a predetermined distance above the first substrate. When the outer edges of the mirror structure do not make contact with the first substrate, the stiction forces associated with contact between the mirror structure and the surface are reduced. Depending on the application, the separation distance is selected to modify one or more parasitic forces and/or modify the tilt angle of the mirror structure.

Referring once again to FIG. 1, mirror structure 140 is coupled to integrated standoff structure 130. For purposes of clarity, FIG. 2 illustrates the electrode structure 120 and the integrated standoff structure 130 without illustrating mirror structure 140. In some embodiments, the multi-layer structure illustrated in FIG. 1 is formed by a series of processing steps including a substrate or wafer bonding process. Additional details regarding the substrate bonding process utilized to form the structure illustrated in FIG. 1 are described in U.S. application Ser. No. 10/756,923, filed Jan. 13, 2004, commonly owned and hereby incorporated by reference for all purposes.

Figure 3:
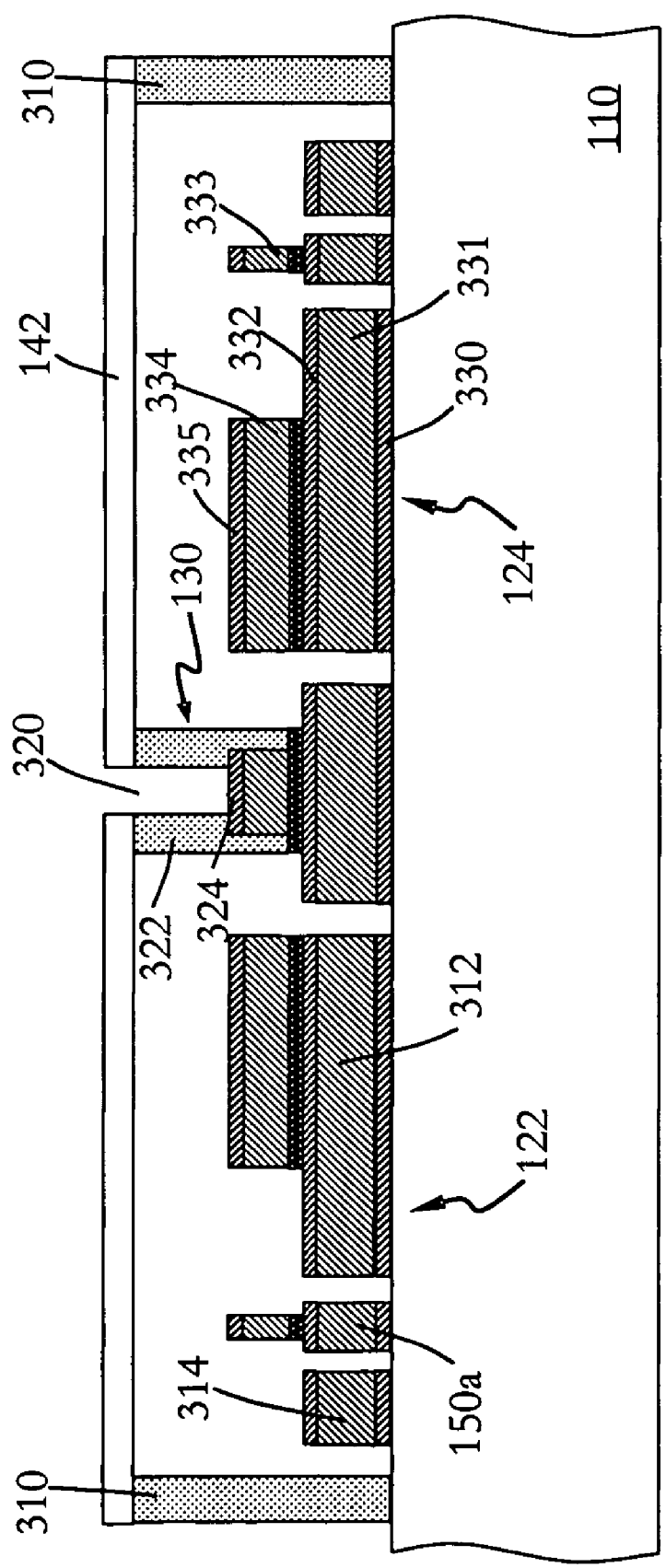
FIGS. 3-14 are simplified schematic cross-section views of an SLM at various stages of a fabrication process according to an embodiment of the present invention.

FIG. 3 is a simplified schematic cross-section view of an SLM at a selected stage of a fabrication process according to an embodiment of the present invention. Although not illustrated in FIG. 3, processes utilizing silicon-on-insulator (SOI) wafers containing device layer 142, generally include polishing, grinding, etching, chemical mechanical polishing, and the like, to remove one or more layers of the SOI wafer, resulting in the formation of device layer 142 illustrated in FIG. 3. As illustrated in FIG. 3, electrodes 122 and 124 are positioned on opposite sides of integrated standoff structure 130. Referring to FIG. 2, landing structure 150a is positioned in a notched portion of electrode 122. Accordingly, in FIG. 3, electrode 122 is represented by two portions 312 and 314. The portions are illustrated as separate in FIG. 3 for purposes of clarity, but it will be appreciated that as illustrated in FIG. 2, the electrode is not, in fact, separated. Moreover, landing structure 150b is not illustrated in FIG. 3 as it is positioned behind landing structure 150a in the cross-section presented in FIG. 3.

Device layer 142 is coupled to the first substrate 110 by the integrated standoff structure 130 and spacer support frames 310. In some embodiments, the spacer support frames 310 are not utilized, whereas, in other embodiments, the integrated standoff structure is not utilized. One of ordinary skill in the art would recognize many variations, modifications, and alternatives. As illustrated in FIG. 3, a via 320 has been formed passing through the device layer 142 and a portion of the integrated standoff structure. In an embodiment according to the present invention, the via passes through an insulating layer 322 to expose a conducting layer 324, such as a titanium nitride layer. As illustrated in FIG. 3, the integrated standoff structure includes layers of aluminum 331 and 334, titanium nitride 330, 332, and 335, and tungsten 333, forming a conductive path from the first substrate to the exposed titanium nitride layer 324. Of course, the integrated standoff structure is not limited to the use of these metals or conductive materials. A bias grid (not shown) is coupled to the integrated standoff structure by methods well known to one of skill in the art.

Figure 4:
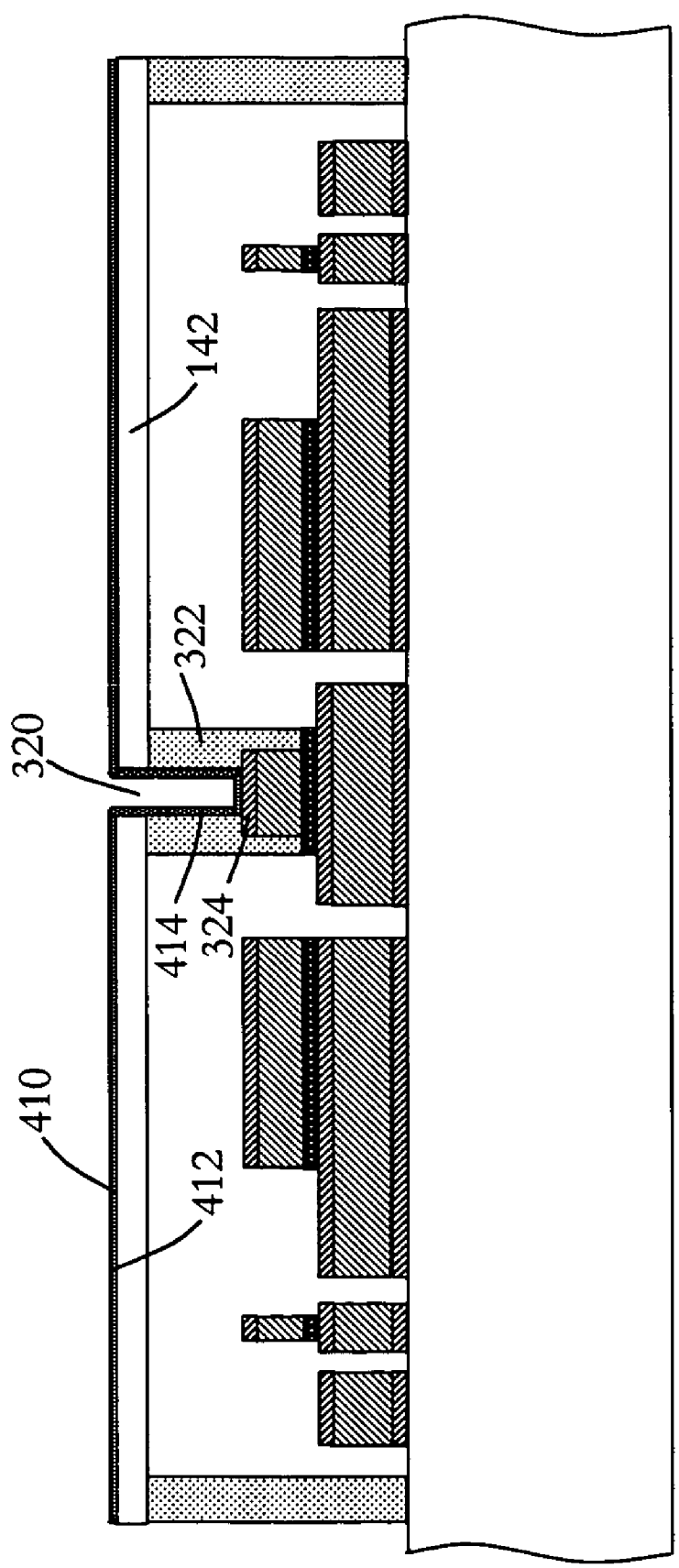

FIG. 4 illustrates the SLM structure at another stage of processing according to an embodiment of the present invention. Adhesion layer 410 is formed on a surface of the device layer 142. In an embodiment, the adhesion layer is a deposited layer and provides a uniform and continuous coat on upper surface 412 of the device layer and on an inner surface 414 of insulting material 322. The adhesion layer makes contact with the exposed titanium nitride layer 324 at the bottom of the via 320. The adhesion layer material is selected to provide a base layer for later depositions as well as for good adhesion to the mirror structure. Additionally, in some embodiments, the adhesion layer is selected to provide for electrical conductivity between the bias grid (not shown) connected to the integrated standoff structure and the surface 412 of the device layer. Merely by way of example, the adhesion layer is a 200 Å layer of titanium deposited by physical vapor deposition (PVD). In alternative embodiment, the thickness of the layer varies from about 100 Å to about 1,000 Å. One of ordinary skill in the art would recognize many variations, modifications, and alternatives.

Figure 5:
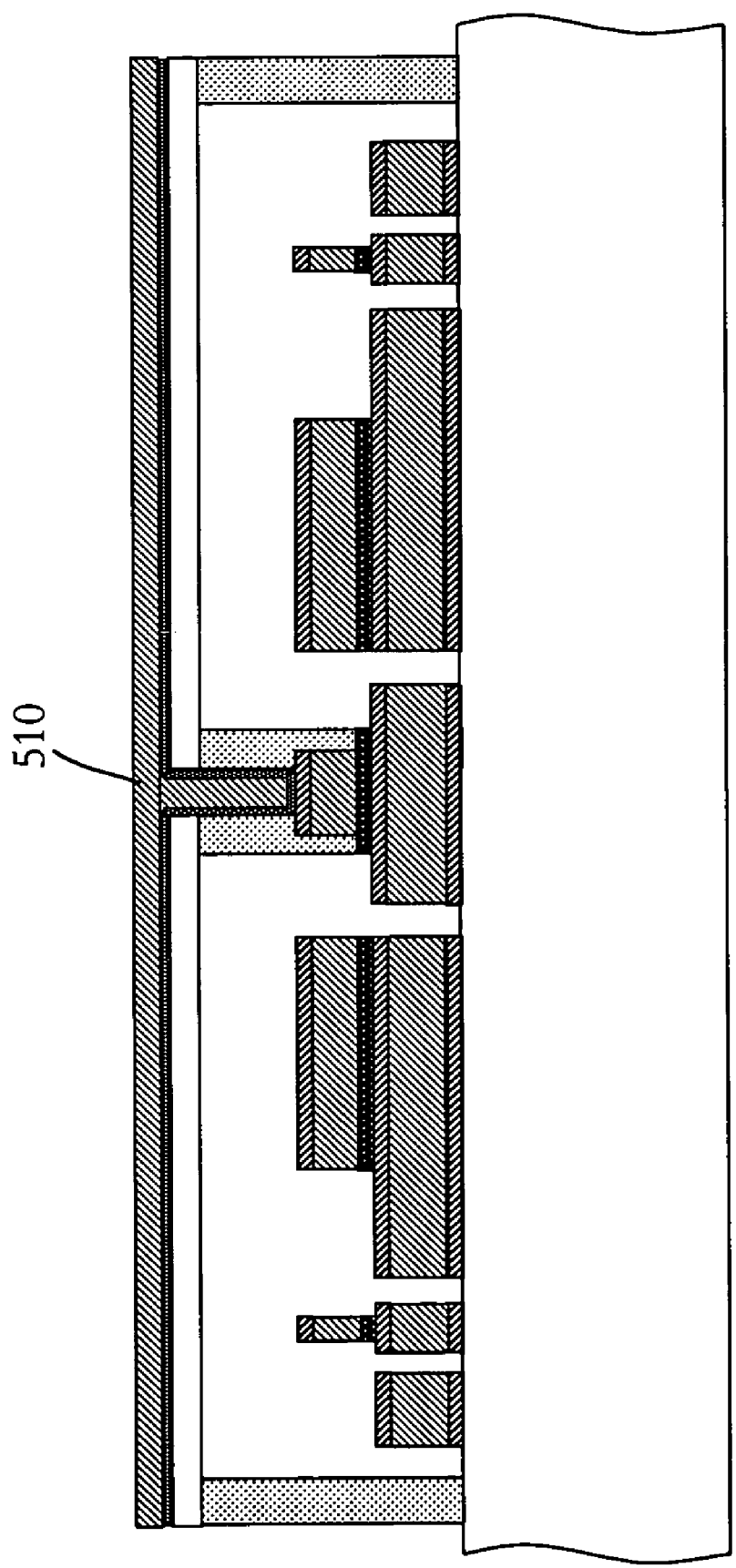

In FIG. 5, a spacer layer 510 is formed on a surface of the adhesion layer. In a specific embodiment, the spacer layer is a deposited metal layer, formed by a PVD deposition process. In an embodiment, the spacer layer 510 is a layer of aluminum 2,000 Å in thickness. In alternative embodiments, the spacer layer has a thickness of about 1,000 Å to about 3,000 Å. Although an aluminum layer is utilized in an embodiment, this is not required by the present invention. Alternative materials that provide mechanical rigidity to the mirror structure and resistance to particular semiconductor processing steps may be utilized in alternative embodiments. Moreover, although the use of an adhesion layer has been illustrated in FIGS. 4 and 5, this layer is not required by the present invention. In some embodiments, a spacer layer which is characterized by good adhesion to the device layer and electrical conductivity is formed directly on the device layer, without the use of an adhesion layer. In these embodiments, the spacer layer 510 makes electrical contact with the exposed titanium nitride layer.

Figure 6:
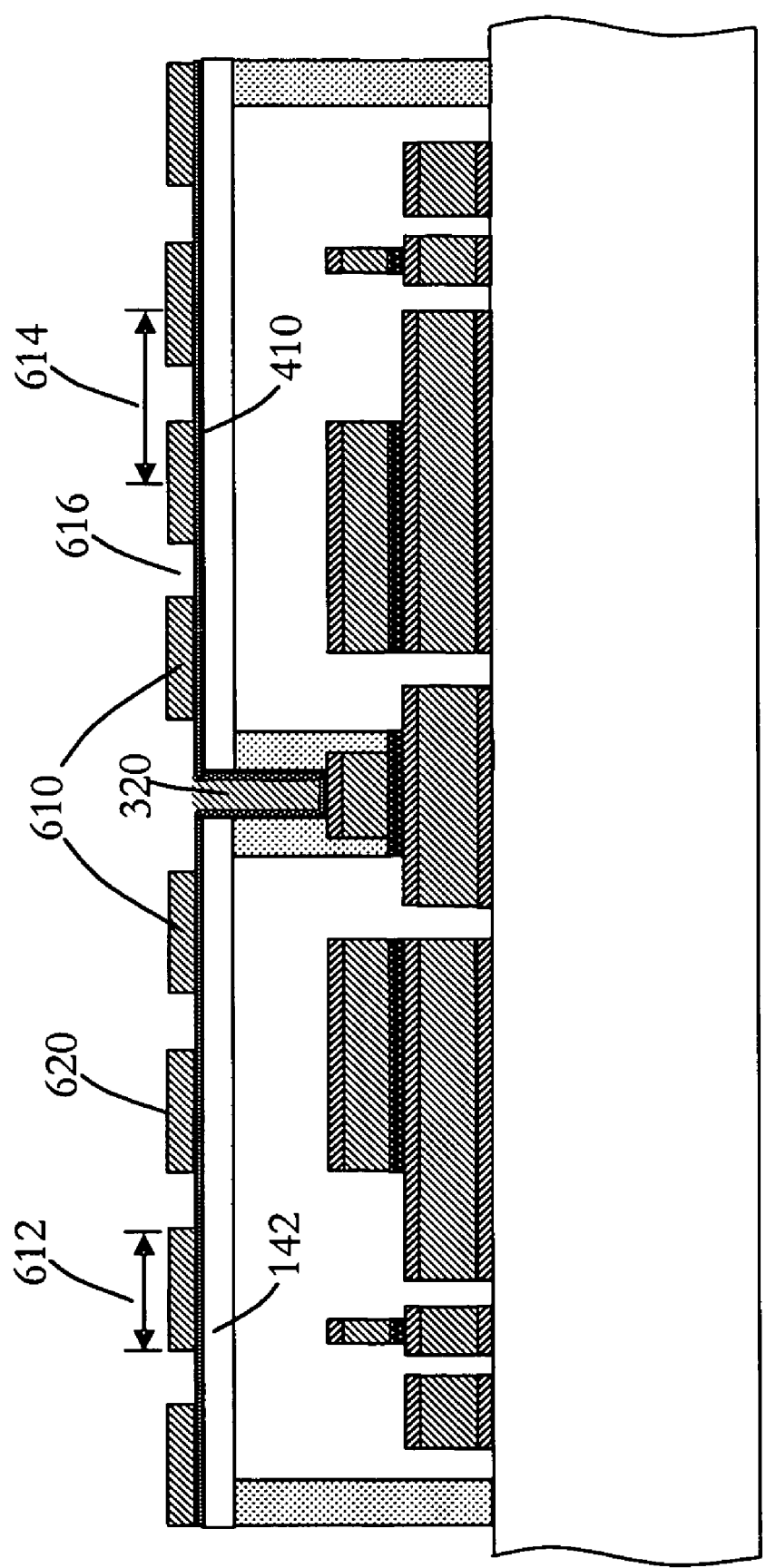

FIG. 6 illustrates the SLM structure at yet another stage of processing according to an embodiment of the present invention. As illustrated in FIG. 6, the spacer layer is patterned to form a series of raised ridges 610 running in parallel lines across the top of the adhesion layer. The ridges 610 illustrated in FIG. 6 have a width 612 that is constant over the surface of the mirror structure and have a center-to-center spacing between ridges 614 approximately equal to 1.5 times the ridge width. The dimensions and layout of the raised ridges are selected to provide mechanical support for subsequently deposited layers while minimizing the stress induced in the device layer. In particular, the spaces 616 between adjacent ridges provide stress release for the structure and may be referred to as stress relief channels. As will be evident to one of skill in the art, layers with different material properties may introduce stress into a composite material formed from such different materials. Thus, according to embodiments of the present invention, the spacer layer is patterned to reduce the surface area of the device layer covered by the spacer layer, thus, reducing stress levels.

In an embodiment, the spacer layer is patterned by a photolithographic process. In a specific embodiment, an etch mask layer, for example, a silicon dioxide ($SiO_2$) layer, is formed on the spacer layer. Subsequently, a photoresist layer is deposited and patterned and subsequent processing steps are used to form the etch mask. The formation of an etch mask (either of photoresist or other material) will be evident to those of skill in the art. Utilizing the etch mask, the spacer layer is etched to form the raised ridges 610. Merely by way of example, the spacer layer may be removed using a plasma etch terminating at the surface of the mirror structure. In alternative embodiments, the adhesion layer is patterned along with the spacer layer, exposing device layer 142 in the spaces 616 between adjacent ridges.

As illustrated in FIG. 6, the etch process is terminated when the adhesion layer 410 is exposed. In this embodiment, the spacer layer is etched to form the ridges, but the mirror structure layers, including the device layer 142 is not exposed. The etch mask protects the tops 620 of the ridges during the etching process, preserving a uniform layer for subsequent deposition processes. Additionally, as illustrated in the figure, material from the adhesion layer and the spacer layer fills the via 320 previously formed in the integrated standoff structure.

Figure 7:
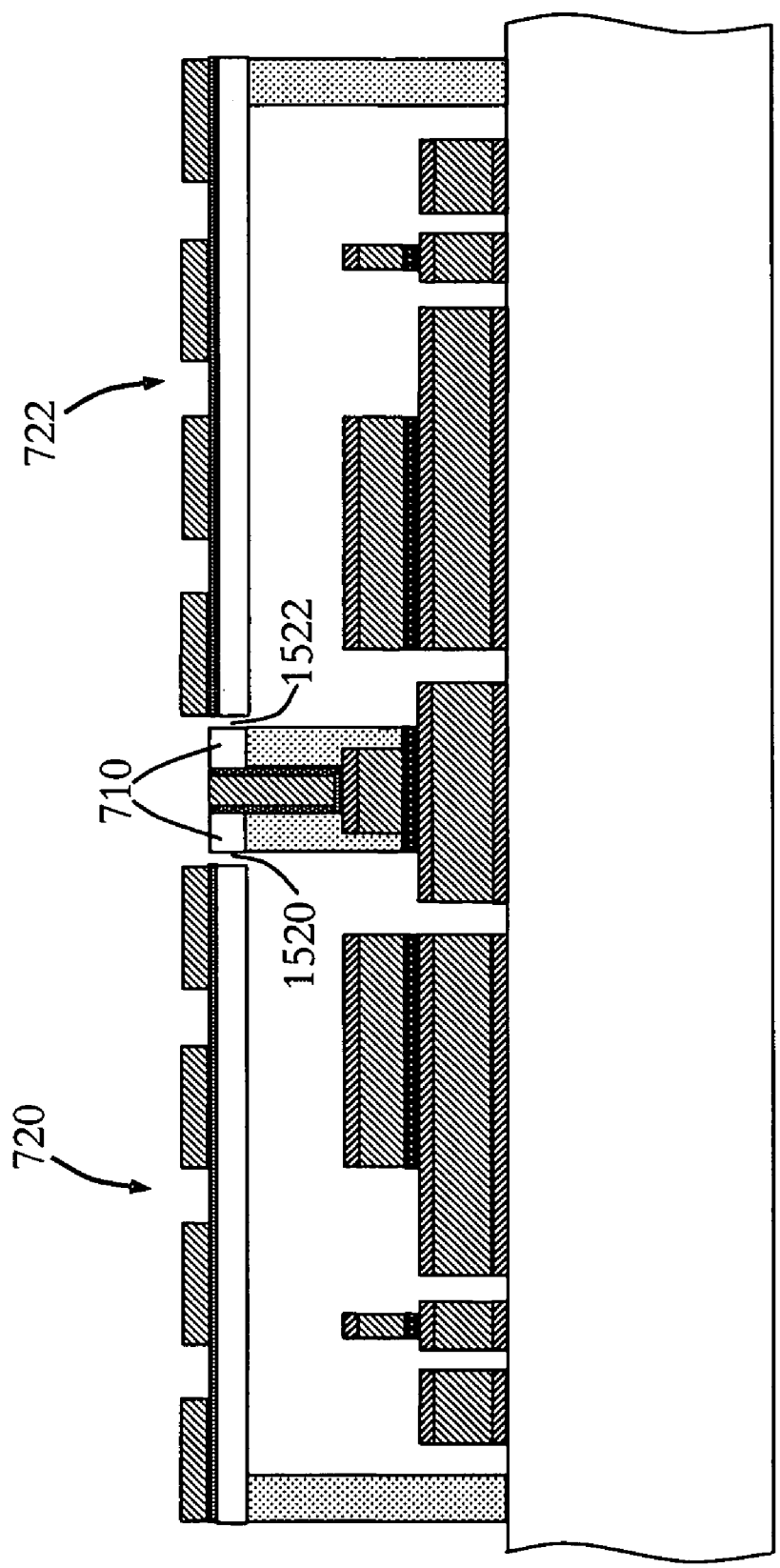

Referring to FIG. 7, a flexible member 710 is formed in device layer 142 to enable the mirror plates 720 and 722 to rotate about a longitudinal axis of the flexible member. As illustrated in FIG. 7, the longitudinal axis is normal to the plane of the figure and the mirror plates rotate in a clockwise and counter-clockwise manner. In a specific embodiment, the flexible member 710 is a torsion spring hinge.

Figure 15:
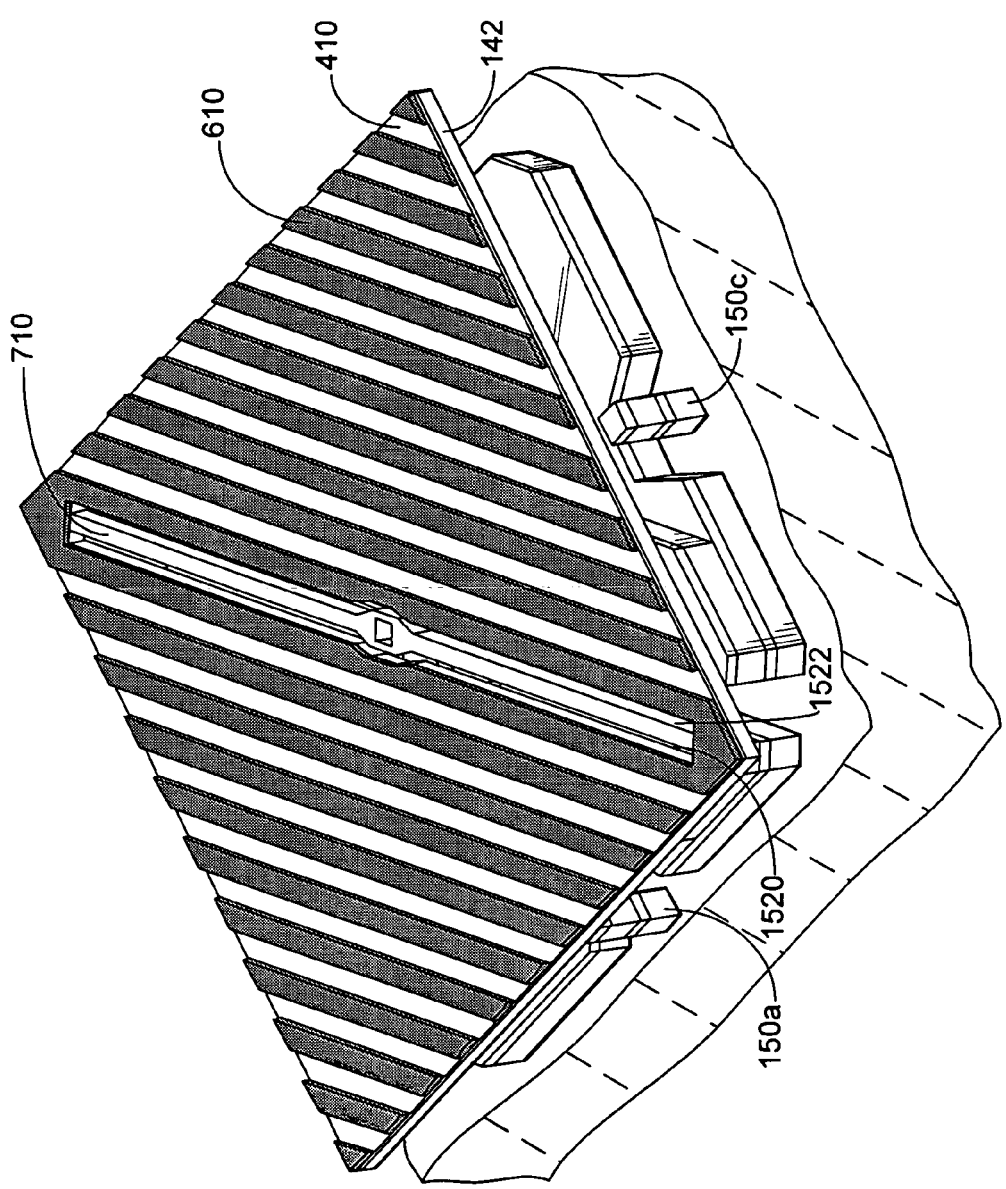
FIG. 15 is a simplified perspective view of a patterned spacer layer for an SLM according to an embodiment of the present invention.

FIG. 15 is a simplified perspective view of a patterned spacer layer for an SLM according to an embodiment of the present invention. With reference to this figure, as well as FIGS. 6 and 7, the device layer 142, adhesion layer 410, and the patterned spacer ridges 610 are visible. Additionally, the flexible member in the form of a torsion spring hinge 710 is illustrated in FIG. 15. As FIG. 7 illustrates a cross section through the central portion of the SLM, the flexible member in the form of a torsion spring hinge illustrated in FIG. 7 includes two sections separated by the via 320. Of course, as will be evident to one of skill in the art, the cross sectional shape of the flexible member varies as a function of the longitudinal direction, characterized by a single rectangular shape in some portions and multiple sections as illustrated in FIG. 7. One of ordinary skill in the art would recognize many variations, modifications, and alternatives.

The central portion of the torsion spring hinge is coupled to the integrated standoff structure. At the corner regions of the mirror structure, the torsion spring hinge is coupled to the device layer. Accordingly, upon activation by the electrodes, the mirror structure rotates about the longitudinal axis of the hinge (the x-direction) in the y-z plane. The device layer makes contact with landing structure 150a in a first activated position and with landing structure 150c in a second activated position.

The dimensions and spacing of the raised ridges 610 as illustrated in FIG. 15 are selected, as discussed above, to reduce stress present in the device layer 142. Accordingly, the periodicity may be uniform across the surface of the device layer, as illustrated in FIG. 15. However, in other embodiments, the periodicity is a function of lateral position, providing increasing or decreasing pitch as a function of position. Moreover, although the embodiment illustrated in FIG. 15 provides for uniform width as a function of position, this is not required by the present invention. In some embodiments, both the periodicity and width are functions of position, selected to reduce and/or minimize stress in the device layer. One of ordinary skill in the art would recognize many variations, modifications, and alternatives.

In a specific embodiment, the openings 1520 and 1522 are formed in device layer 142 and selected portions of standoff structures (not shown) to release the micro-mirror in a manner to allow for rotation of the mirror around an axis. In the embodiment illustrated in FIG. 15, the width of the torsion spring measured along a direction (the y-direction) perpendicular to the longitudinal axis of the hinge (the x-direction) is a predetermined distance. Merely by way of example, the width of the torsion spring hinge in an embodiment is about 0.2 μm.

Moreover, the thickness of the torsion beam, measured in the z-direction, is equal to the thickness of device layer 142. In some embodiments, the thickness of device layer is defined by a semiconductor substrate formation process, providing tightly controlled uniformity across an entire substrate. In a specific embodiment, the thickness of device layer is determined during the fabrication of the silicon-on-insulator substrate from which device layer is formed. Accordingly, the material properties of the torsion spring hinges distributed across the substrate are uniform, resulting in equal activation voltages and the like.

Figure 8:
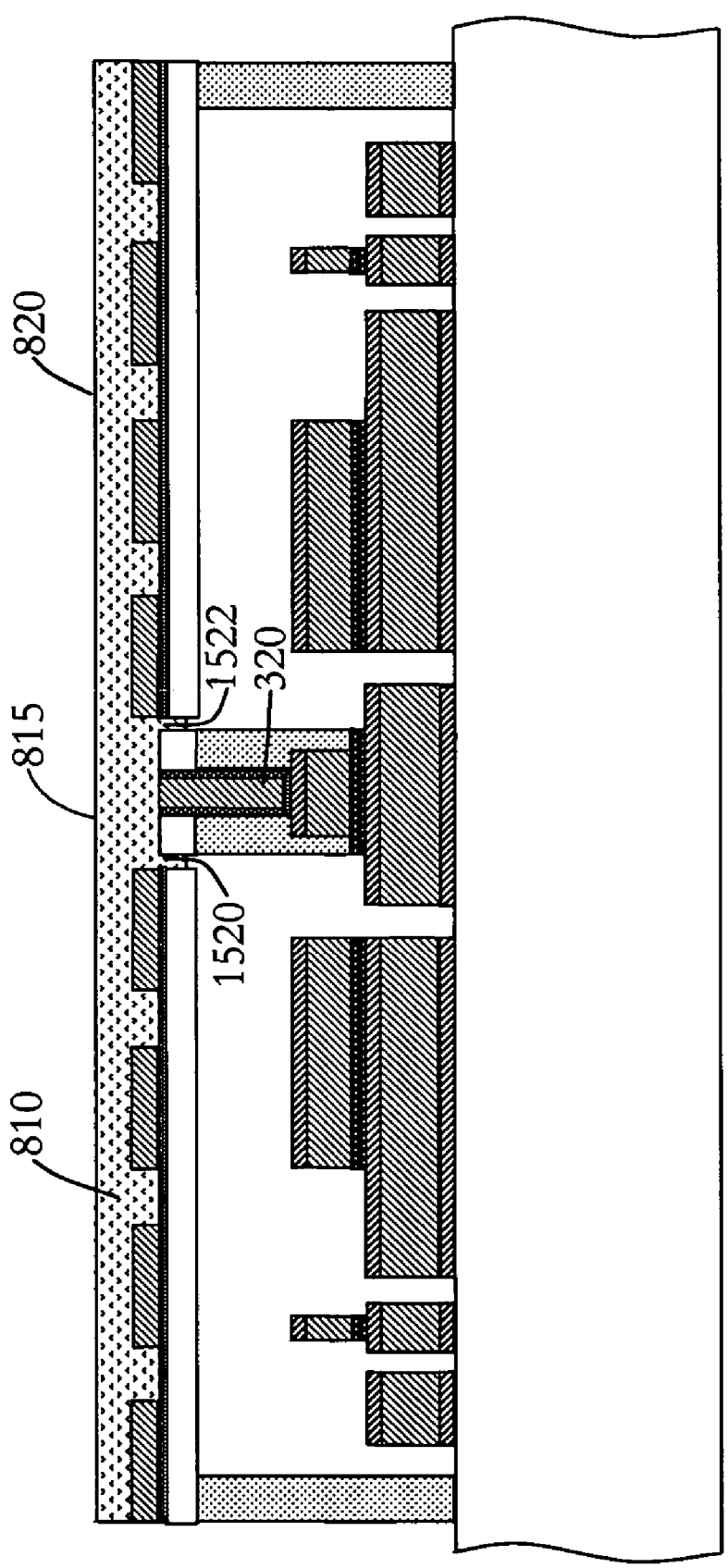

In FIG. 8, a release layer 810 is formed on the surface of the SLM, filling the spaces between adjacent raised ridges 610 and the torsion spring section 815. As illustrated, the release layer material is present not only above the spacer layer material filling via 320, but in openings 1520 and 1522 between flexible member 710 and the device layer. Referring to FIG. 15, the release layer material fills the gaps 1520 and 1522 created during the process of forming the flexible member. In some embodiments, depending on the particular release layer materials utilized, the release layer material may flow down through these gaps, making contact with the electrodes, landing structures, and first substrate.

In a specific embodiment, the release layer is formed by depositing a release material, for example, photoresist, using a photoresist spin bowl as is well known to one of skill in the art. Subsequent baking and curing steps are utilized to solidify the photoresist layer. The release material is selected for mechanical strength coupled with the ability to be selectively removed by particular semiconductor processing sequences, as described more fully below. As illustrated in FIG. 8, the release layer 810 is defined by a varying thickness measured normal to the surface of the device layer. In regions above the raised ridges, the release layer is characterized by a thickness less than in regions above spaces between adjacent raised ridges. Accordingly, the release layer has a uniform upper surface 820 as illustrated. However, this is not required by the present invention. In alternative embodiments, the release layer has a non-uniform thickness, which may result from the particular process used to form the release layer.

Figure 9:
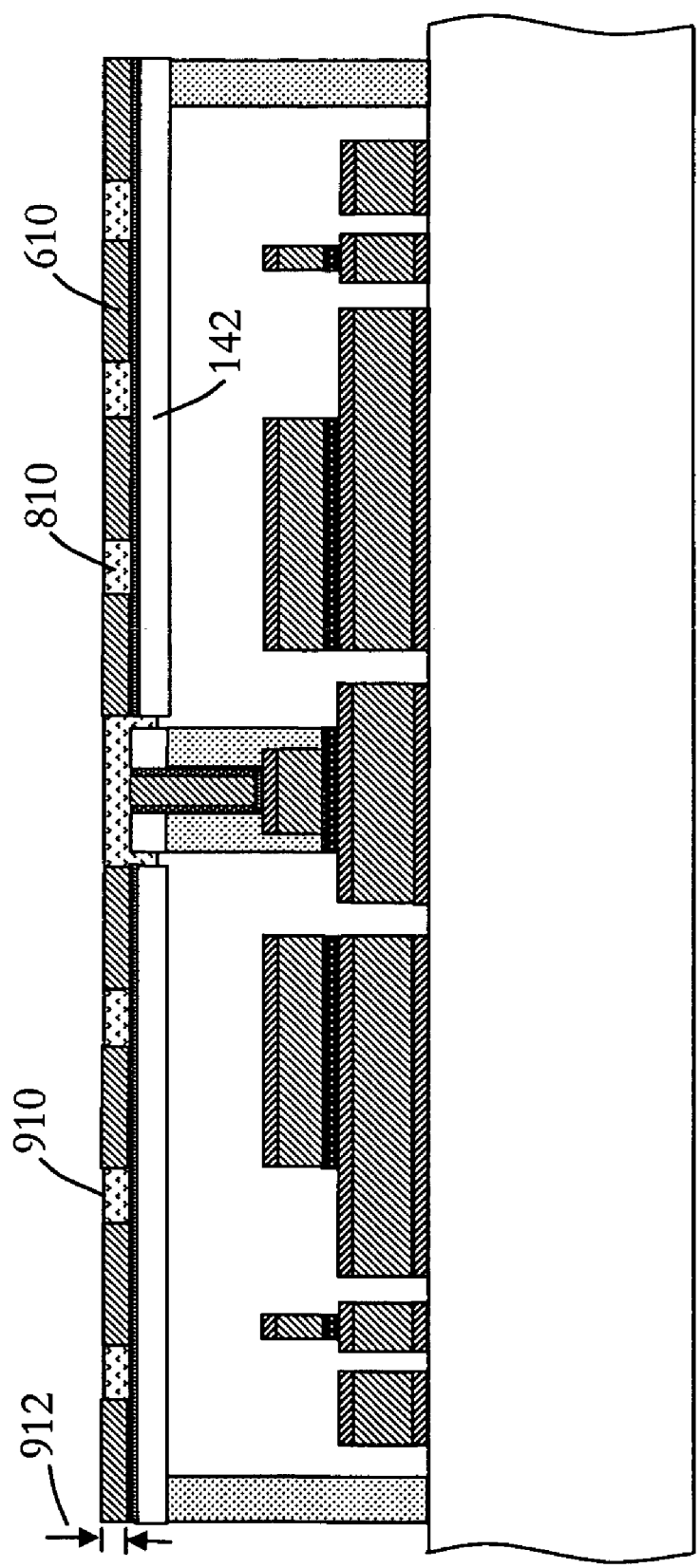

FIG. 9 illustrates the SLM structure at a further stage of processing according to an embodiment of the present invention. The SLM in FIG. 9 includes a planarized surface 910 in which the release layer material 810 and the spacer layer ridges 610 are coplanar, defining a composite layer extending from device layer 142 to a first height 912. Generally, during photolithography processes, the exposure power of the light source is selected to penetrate the entire thickness of the photoresist layers present on the substrate surface.

However, other photolithography processes expose less than the entire thickness. In a specific embodiment according to the present invention, the exposure energy is controlled to expose the release layer to a predetermined depth. Merely by way of example, as illustrated in FIG. 9, the release layer is exposed to a depth aligned with the top surface 620 of the spacer layer ridges. Accordingly, the release layer, after a develop process, is characterized by the same thickness as the spacer layer ridges. According to embodiments of the present invention, the release layer is totally removed above a plane defined by the top surface of the spacer layer ridges, providing a coplanar surface as illustrated in FIG. 9. After the planarization step illustrated in FIG. 9, the top layer 910 provides a flat and uniform surface for future processing.

Figure 10:
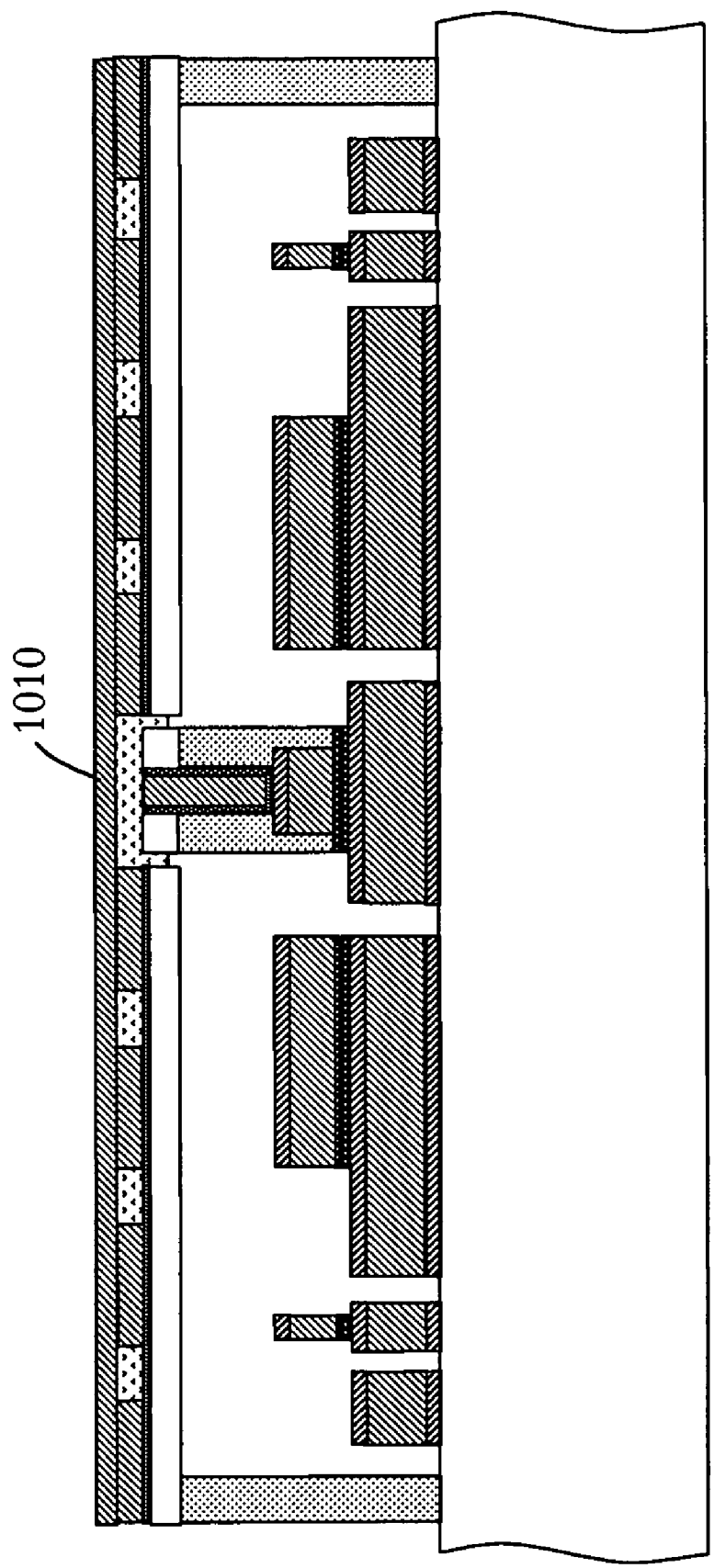

FIG. 10 illustrates the formation of a reflective layer 1010 in contact with the spacer ridges and the release material. In a specific embodiment, the reflective layer is a reflective layer of aluminum deposited using a PVD process. In the embodiment illustrated in FIG. 10 the reflective layer is 300 Å thick and provides a uniform coating over the surface of the SLM. In some embodiments, the reflective layer is characterized by a reflectivity above 95% over much of the visible optical spectrum. Moreover, in some embodiments, an optional seed film (not shown), such as a 100 Å thick layer of titanium, is deposited prior to the formation or deposition of the reflective layer. Preferably, the thin nature of the reflective material deposited on the surface of the mirror structure ensures that it inherits the flat, smooth surface of the upper surface 910 previously formed during the planarization process illustrated in FIG. 9.

Figure 11:
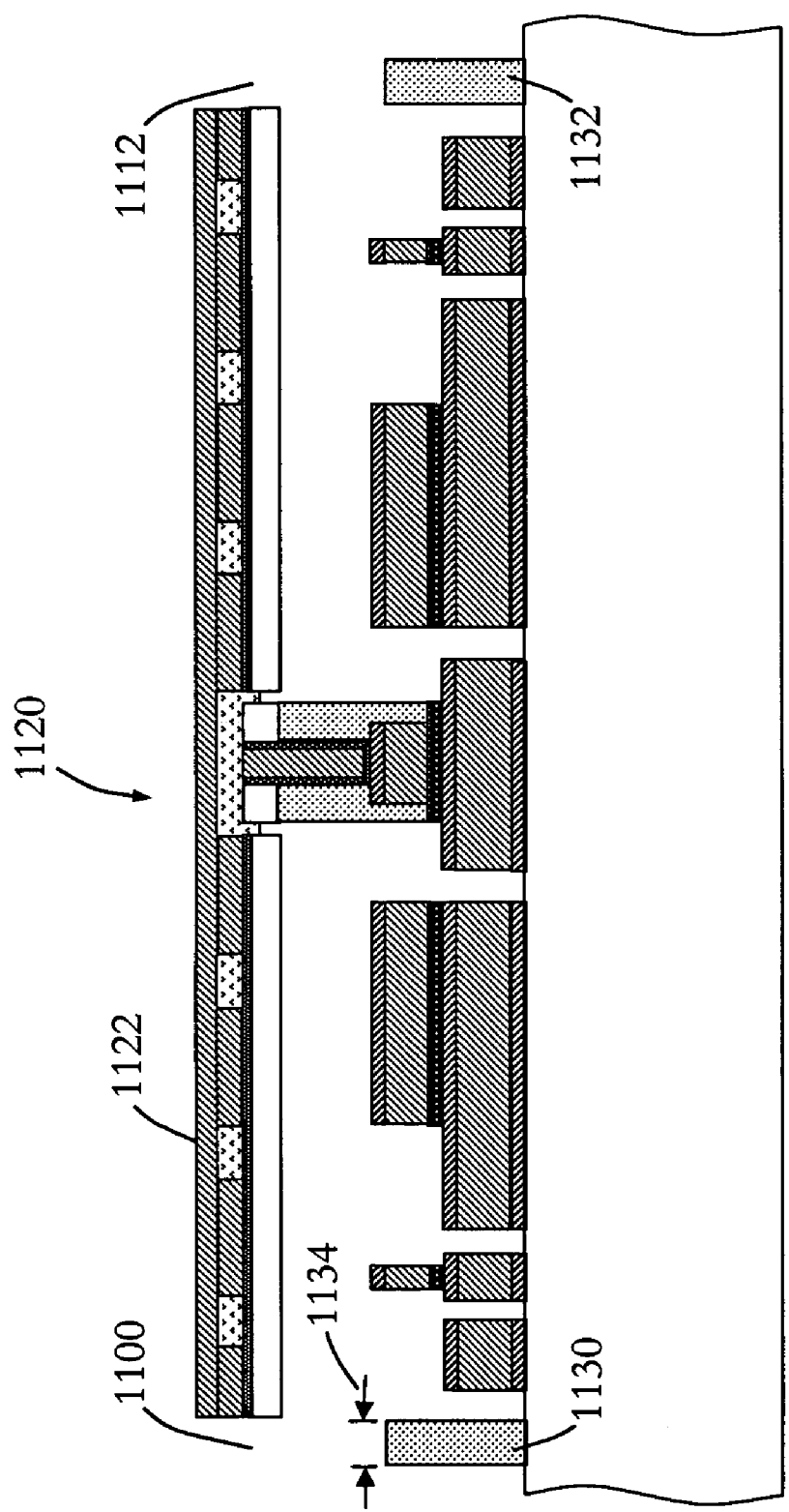
Figure 16:
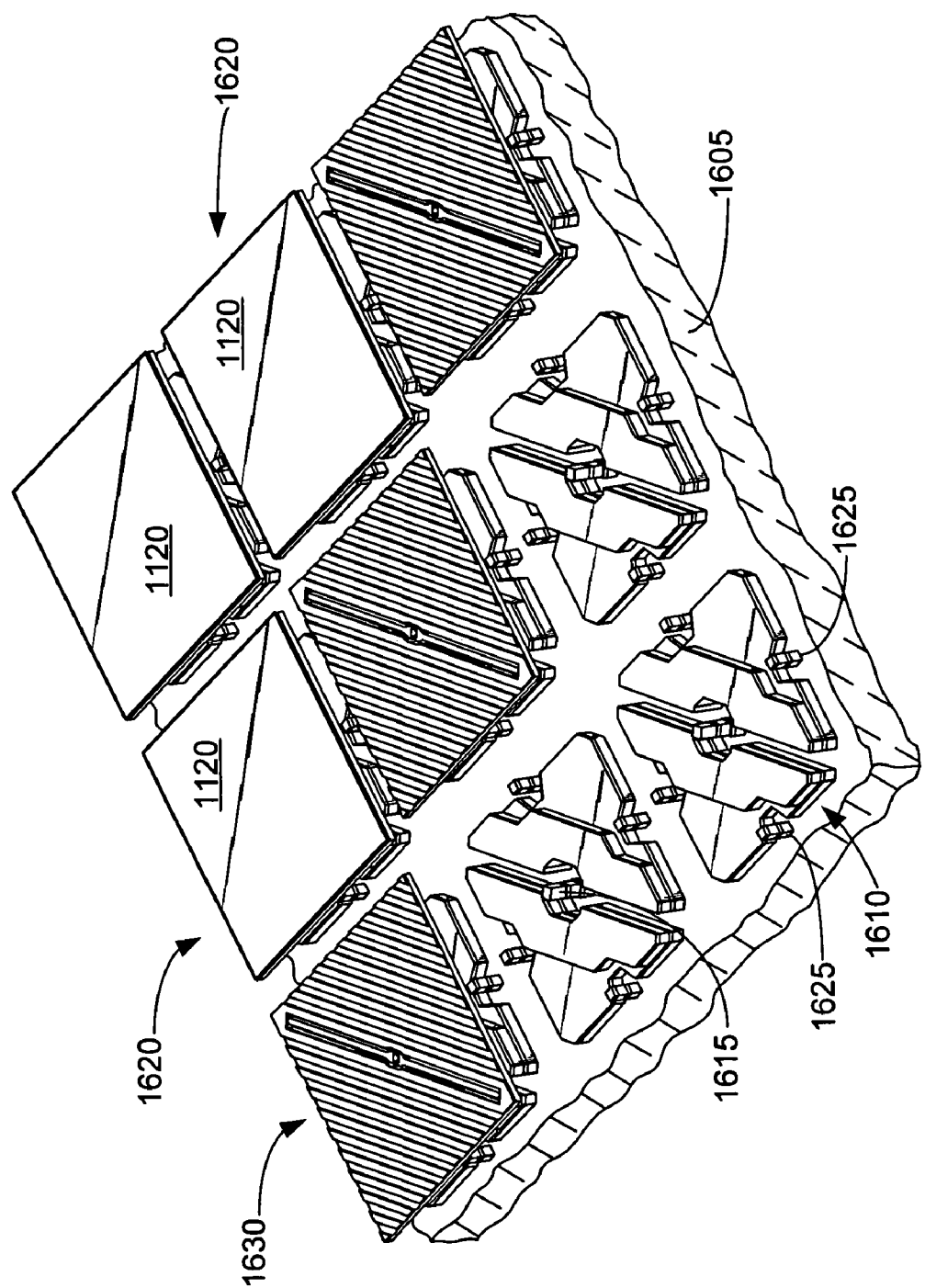
FIG. 16 is a simplified cutaway perspective view of an array of SLMs according to an embodiment of the present invention.

FIG. 11, discussed with reference to FIG. 16, illustrates a mirror release step at a particular stage of processing according to an embodiment of the present invention. The reflective layer 1010 is patterned using photolithographic processes and processed to form a number of openings 1110 and 1112, creating a number of micro-mirrors 1120. Although FIG. 11 illustrates a cross-sectional view of the mirror structures, one of ordinary skill in the art will appreciate that a three-dimensional structure is represented as illustrated by FIG. 16. Openings 1110 and 1112, along with other openings, provide for separation between adjacent micro-mirrors 1120 as illustrated in FIG. 16.

The fill factor for an array of SLMs is a function of the gap between adjacent mirrors as well as the surface features of the SLM. Because the openings 1110 and 1112 are defined using well developed photolithographic processes, the dimensions of the openings are generally well-controlled and may be as small as sub-micron dimensions. Openings 1110 and 1112 separate adjacent mirrors from each other, enabling for mirror rotation as described below. In a particular embodiment, the space between adjacent mirrors is about 0.2 μm. Moreover, the planar surface provided for the mirror surface 1122, with the hinge positioned beneath the reflective layer, increases the fill factor of the SLM array.

Portions of spacer support frames 1130 and 1132 have been removed in the processing steps leading to the structure illustrated in FIG. 11. In some embodiments, the spacer support frames are removed, with the thickness 1134 of the spacer support frame defining the separation between adjacent micro-mirrors. In other embodiments, the spacer support frames are not removed, but provide mounting points for the flexible member and mechanical support to suspend the device layer above the first substrate.

Figure 12:
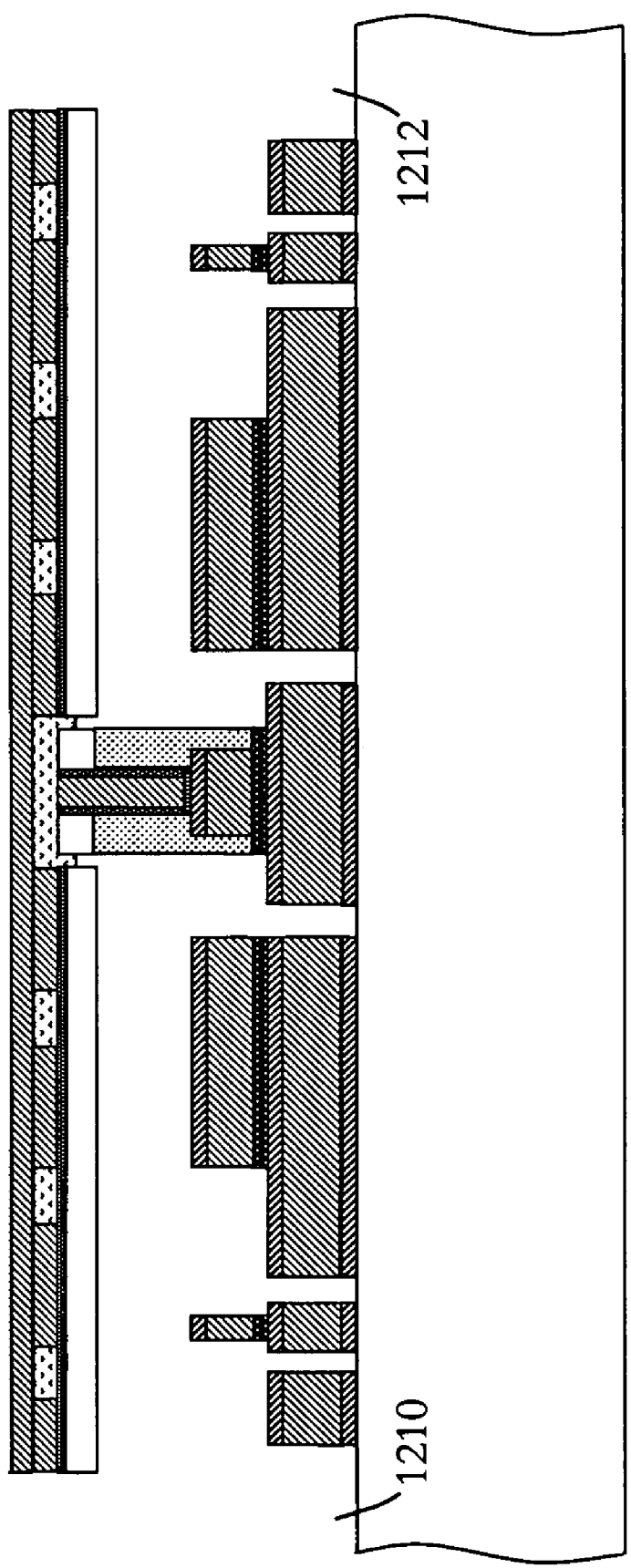

FIG. 12 is a simplified schematic cross-section view of an SLM at an additional stage of a fabrication process according to an embodiment of the present invention. As illustrated in the figure, the spacer support frames have been completely removed in the locations 1210 and 1212 below the openings between mirrors. In some applications, the removal of the spacer support frames reduces scattering of light, thus improving contrast ratios. As an example, in a display application in which incident light impinges on an array as illustrated in FIG. 16, light passing through the openings between mirrors may be reflected off spacer support frames and pass back through the openings and into the optical display system, thus reducing system contrast. Utilizing embodiments of the present invention as illustrated in FIG. 12, the removal of the spacer support frames reduces such back reflection.

Figure 13:
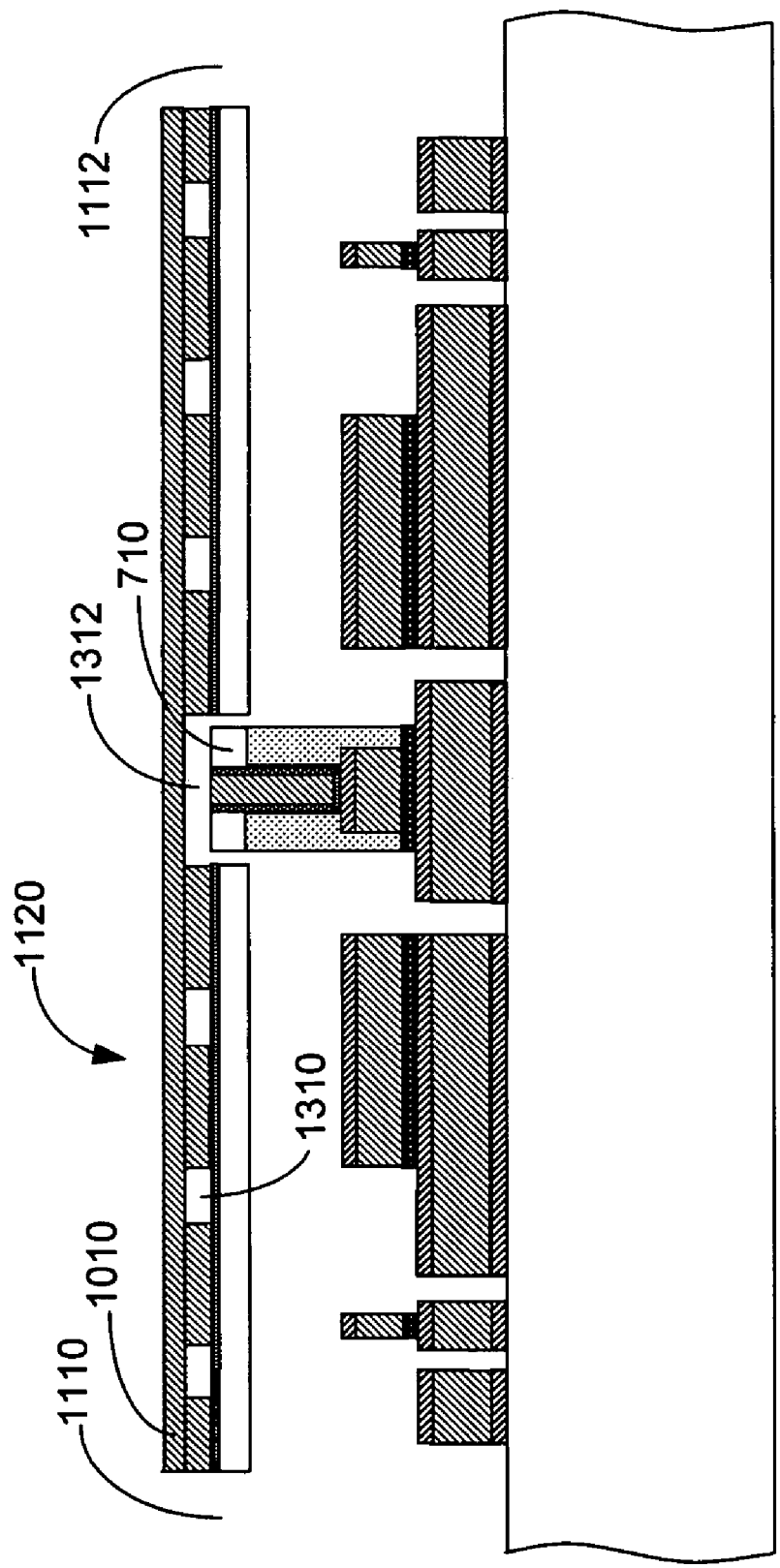

FIG. 13 illustrates the removal of the release material formed as illustrated in FIG. 8 to free the micro-mirror 1120 to rotate about torsion spring hinge 710. In an embodiment, a oxygen plasma ashing process is used to remove a release layer formed from photoresist. In this embodiment, the dry process is performed in a plasma ashing chamber for approximately six minutes. Referring to FIG. 13 and FIG. 1, the release material is removed from the regions 1310 located between the raised ridges, as these regions are exposed at the edges of the mirror plates. Moreover, the release material surrounding the torsion spring hinges in regions 1312 is removed from below the reflective layer 1010 as the reactive gases are able to pass between adjacent mirrors through openings 1110 and 1112, above the electrode layer, and to the hinge regions.

Figure 14:
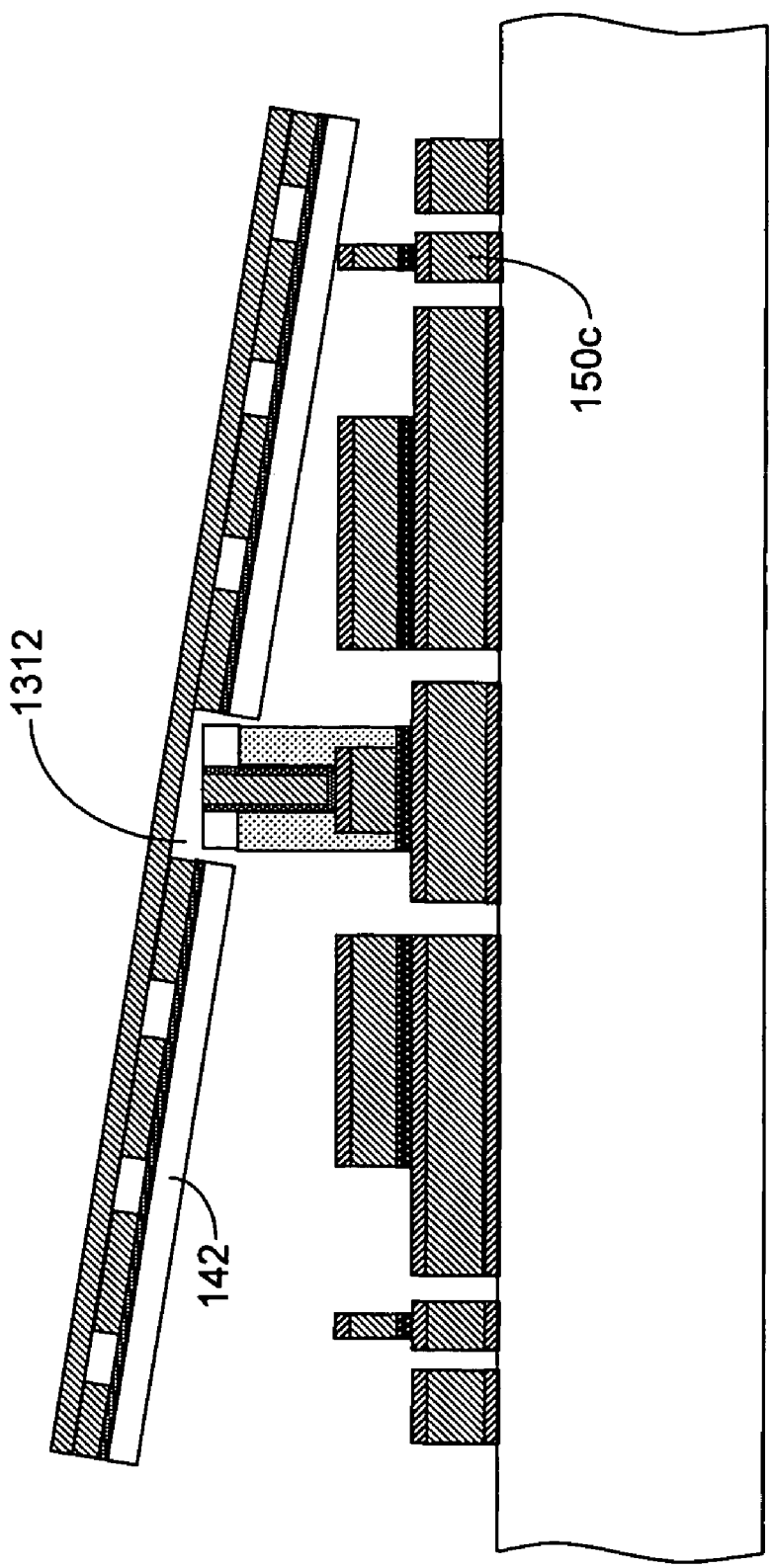

FIG. 14 illustrates an SLM in an activated state in which the device layer 142 makes contact with landing structure 150c. As illustrated in FIG. 13 and FIG. 14, the separation in region 1312 between the top of the flexible member (e.g., a torsion spring hinge) and the reflective layer provides a space for the mirror to rotate without making contact between the reflective layer and the top of the torsion spring hinge.

FIG. 16 is a simplified cutaway perspective views of an array of SLMs according to an embodiment of the present invention. As illustrated in FIG. 16, the array of SLMs includes multi-level electrode structures 1610 coupled a first substrate 1605, sometimes referred to as an electrode substrate. Integrated standoff structures 1615 are also coupled to the first substrate and positioned between pairs of matched electrodes. Mirror structures 1620 are coupled to the integrated standoff structures, generally by a substrate bonding process. The mirror structures include flexible members extending along a diagonal of the micro-mirrors and coupled to the device layer. Openings, as described previously, separate adjacent micro-mirrors from each other and, in conjunction with the flexible members enable the micro-mirrors to rotate in response to electrical activation by the electrodes. Landing posts 1625 are provided in some embodiments of the present invention, arresting the motion of the mirror structure and reducing the contact area between the lower surface of the device layer and the support mechanisms.

Furthermore, the mirror structure with patterned spacer layer 1630 is illustrated in FIG. 16. Of course, this cutaway view is merely representative of the array of SLMs at various stages of processing. Independent control of the SLMs in an array is utilized in embodiments according to the present invention to form displays and other apparatus.

Figure 17:
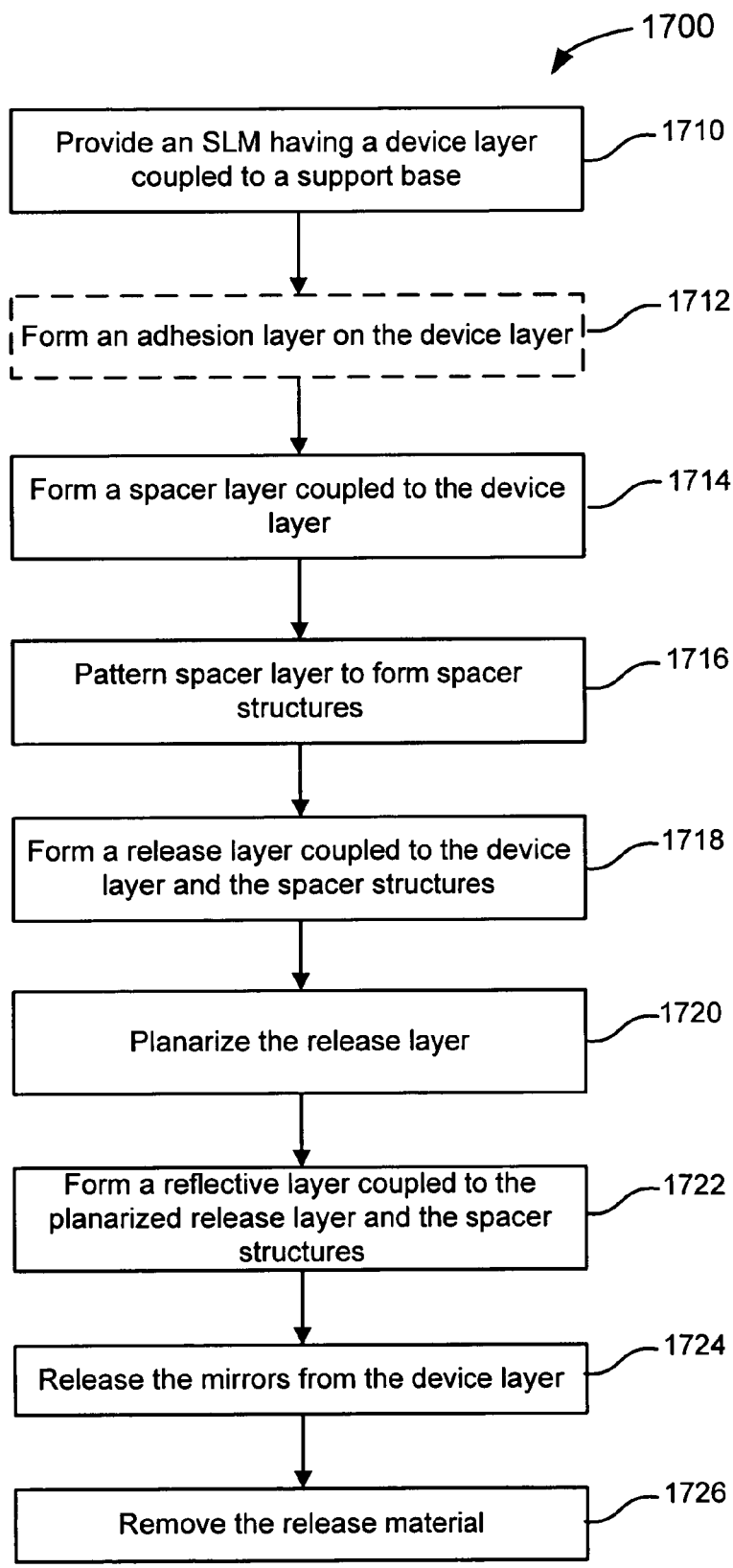
FIG. 17 is a simplified flowchart illustrating a process of manufacturing an SLM according to an embodiment of the present invention.

FIG. 17 is a simplified flowchart illustrating a process 1700 of manufacturing an SLM according to an embodiment of the present invention. In step 1710, an SLM having a device layer coupled to a support base is provided. The support base may be a silicon oxide support structure coupled to an electrode substrate and adapted to support a number of micro-mirrors associated with a number of electrodes on the electrode substrate. In some embodiments, the support base may be joined to the device layer using substrate bonding techniques and the composite structure may be subsequently patterned to form a number of flexible members (e.g., torsion spring hinges) that are coplanar with the device layer. As described below, semiconductor processing techniques are utilized in some embodiments to form a number of mirrors, in particular micro-mirrors arranged in a two dimensional spatial pattern as an array, thus forming an array of SLMs.

An optional step of forming an adhesion layer is performed in step 1712. In some embodiments the adhesion layer is a 200 Å thick layer of titanium deposited using a PVD deposition process. Depending on the particular embodiment, the adhesion layer may coat internal portions of vias in the support base, making electrical contact between a bias layer in the electrode substrate and the device layer.

In step 1714, a spacer layer coupled to the device layer is formed. In embodiments which utilize optional step 1712, the spacer layer is formed on the adhesion layer coupled to the device layer. In a specific embodiment, the spacer layer is a PVD deposited aluminum layer 2,000 Å thick. The spacer layer is patterned in step 1716 to form a spacer structure, for example, a series of raised ridges separated by lateral gaps. In some embodiments, the adhesion layer is also patterned, whereas in other embodiments, the adhesion layer is maintained as a coating on the device layer. The spacer structure dimensions are selected to minimize structural stress while still providing a mechanically stable base for a subsequently formed reflective layer.

A release layer is formed in step 1718. In a specific embodiment, the release material is photoresist and the photoresist layer is deposited using well known photolithography processes. The release layer is planarized in step 1720. In some embodiments, the thickness of the release layer is reduced to equal that of the spacer structures, leaving the release material in the gaps between the spacer structures and surrounding the torsion spring hinges. In a specific embodiment, a resist layer is planarized by controlling the exposure energy of lithography light source, a process sometimes referred to as flash exposure, to reach desired depth in the photoresist layer.

In step 1722, a reflective layer is formed, for example, by a deposition process. In an embodiment, the reflective layer is a layer of aluminum 300 Å thick, providing a reflectivity over 90% over much of the visible portion of the spectrum. The reflective layer is patterned and processed in step 1724 to release a number of mirror structures from the device layer. In some embodiments, the aluminum reflective layer and the underlying silicon device layer are etched using a plasma etch to release the mirrors from the device layer. In step 1726, the release material is remove from the area surrounding the torsion spring hinges and between the spacer structures. For example, in embodiments in which the release material is photoresist, the photoresist may be removed using an oxygen plasma ashing process. One of ordinary skill in the art would recognize many variations, modifications, and alternatives.

The above sequence of steps provides a method for fabricating an optical device according to an embodiment of the present invention. As shown, the method uses a combination of steps including a way of forming a spacer layer and releasing a number of mirrors from a device layer according to an embodiment of the present invention. Other alternatives can also be provided where steps are added, one or more steps are removed, or one or more steps are provided in a different sequence without departing from the scope of the claims herein.

Figure 18:
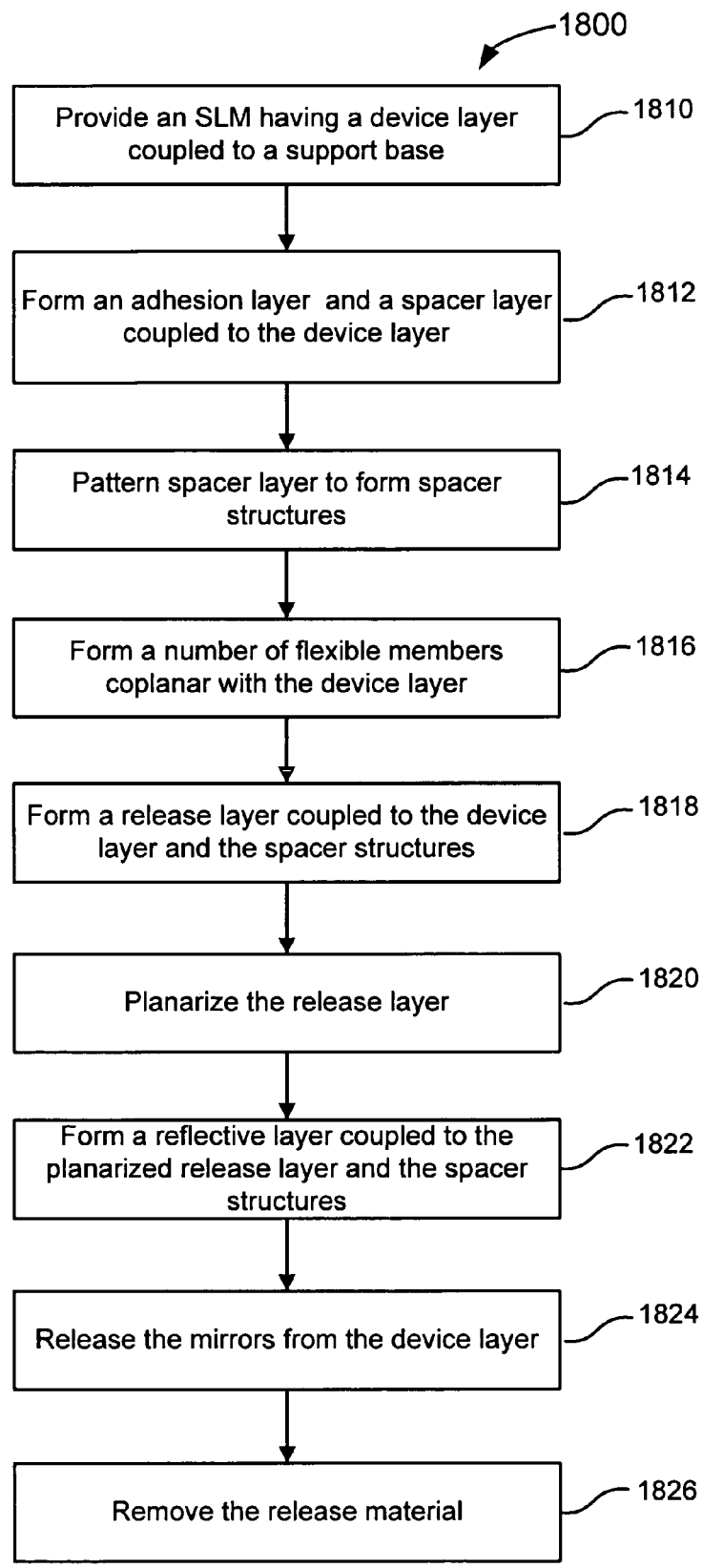
FIG. 18 is a simplified flowchart illustrating a process of manufacturing an SLM according to an alternative embodiment of the present invention.

FIG. 18 is a simplified flowchart illustrating a process 1800 of manufacturing an SLM according to an alternative embodiment of the present invention. In this process, step 1810 provides an SLM having a device layer coupled to a support base. The support base may be a silicon oxide support structure coupled to an electrode substrate and adapted to support a number of micro-mirrors associated with a number of electrodes on the electrode substrate. In some embodiments, the support base may be joined to the device layer using substrate bonding techniques. As described below, the device layer and support base are subsequently patterned to form a number of flexible members (e.g., a torsion spring hinges) that are coplanar with the device layer. As described below, semiconductor processing techniques are utilized in some embodiments to form a number of mirrors, in particular micro-mirrors arranged in a two dimensional spatial pattern as an array, thus forming an array of SLMs.

In step 1812, an adhesion layer and a spacer layer coupled to the device layer are formed. In some embodiments the adhesion layer is a 200 Å thick layer of titanium deposited using a PVD deposition process. In a specific embodiment, the spacer layer is a PVD deposited aluminum layer 2,000 Å thick. The spacer layer is patterned in step 1814 to form a spacer structure, for example, a series of raised ridges separated by lateral gaps. In some embodiments, the adhesion layer is also patterned, whereas in other embodiments, the adhesion layer is maintained as a coating on the device layer.

The spacer structure dimensions are selected to minimize structural stress while still providing a mechanically stable base for a subsequently formed reflective layer.

In step 1816, a number of flexible members, for example, torsion spring hinges, are formed from the device layer. In this embodiment, the flexible members are coplanar with the device layer, enabling the device layer to rotate about a longitudinal axis of the flexible member. In some embodiments, this structure provides the benefit of not introducing translational movement of mirrors arranged in an array during rotation of individual mirrors.

A release layer is formed in step 1818. In a specific embodiment, the release material is photoresist and the photoresist layer is deposited using well known photolithography processes. The release layer is planarized in step 1820. In some embodiments, the thickness of the release layer is reduced to equal that of the spacer structures, leaving the release material in the gaps between the spacer structures and surrounding the torsion spring hinges.

In step 1822, a reflective layer is formed, for example, by a deposition process. In an embodiment, the reflective layer is a layer of aluminum 300 Å thick, providing a reflectivity over 95% over much of the visible portion of the spectrum. The reflective layer is patterned and processed in step 1824 to release a number of mirror structures from the device layer. In some embodiments, the aluminum reflective layer and the underlying silicon device layer are etched using plasma to release the mirrors from the device layer. In step 1826, the release material is remove from the area surrounding the torsion spring hinges and between the spacer structures. For example, in embodiments in which the release material is photoresist, the photoresist may be removed using an oxygen plasma ashing process. One of ordinary skill in the art would recognize many variations, modifications, and alternatives.

The above sequence of steps provides a method for fabricating an optical device according to an alternative embodiment of the present invention. As shown, the method uses a combination of steps including a way of forming a spacer layer and releasing a number of mirrors from a device layer according to an embodiment of the present invention. Other alternatives can also be provided where steps are added, one or more steps are removed, or one or more steps are provided in a different sequence without departing from the scope of the claims herein.

Although the embodiments of the present invention described herein have utilized a central support base for the device layer, this is not required by the present invention. In alternative embodiments, other SLM designs, including torsion spring hinges coupled to support walls surrounding each micro-mirror are provided. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A high fill factor spatial light modulator, the spatial light modulator comprising:
   a device layer coupled to a support base, wherein the device layer comprises a mirror plate and a coplanar flexible member, the mirror plate having a first dimension characterized by a distance between diagonal corners of the mirror plate;
   a patterned spacer layer coupled to the mirror plate, the patterned spacer layer comprising a plurality of longitudinal ribs; and
   a reflective layer coupled to the spacer layer, the reflective layer being continuous over a second dimension equal to the first dimension.

2. The spatial light modulator of claim 1 further comprising an adhesion layer disposed between the mirror plate and the patterned spacer layer, wherein the patterned spacer layer is fabricated from a layer of aluminum and the adhesion layer is a layer of titanium.

3. The spatial light modulator of claim 1 wherein the flexible member is a torsion spring hinge.

4. The spatial light modulator of claim 3 wherein the mirror plate and the torsion spring hinge are fabricated from a single silicon substrate.

5. The spatial light modulator of claim 1 wherein the mirror plate and the flexible member are characterized by an equal thickness measured normal to the reflective layer.

6. The spatial light modulator of claim 1 further comprising an adhesion layer disposed between the mirror plate and the patterned spacer layer.

7. The spatial light modulator of claim 6 wherein the patterned spacer layer is fabricated from a layer of aluminum and the adhesion layer is a layer of titanium.

8. A high fill factor spatial light modulator comprising:
   a device layer coupled to a support base, wherein the device layer comprises a mirror plate and a coplanar flexible member, the mirror plate having a first dimension characterized by a distance between diagonal corners of the mirror plate;
   a patterned spacer layer coupled to the mirror plate, the patterned spacer layer comprising a plurality of longitudinal ribs; and
   a reflective layer coupled to the spacer layer, such that the reflective layer overlies and is spaced apart from the co-planar flexible member, thereby allowing movement of the reflective layer relative to the flexible member, the reflective layer being continuous over a second dimension equal to the first dimension.

9. The spatial light modulator of claim 8 further comprising an adhesion layer disposed between the mirror plate and the patterned spacer layer.

10. The spatial light modulator of claim 9 wherein the patterned spacer layer is fabricated from a layer of aluminum and the adhesion layer is a layer of titanium.

11. The spatial light modulator of claim 8 wherein the flexible member is a torsion spring hinge.

12. The spatial light modulator of claim 11 wherein the mirror plate and the torsion spring hinge are fabricated from a single silicon substrate.

13. The spatial light modulator of claim 8 wherein the mirror plate and the flexible member are characterized by an equal thickness measured normal to the reflective layer.

* * * * *